(12) United States Patent
Alameh et al.

(10) Patent No.: US 7,855,878 B2
(45) Date of Patent: Dec. 21, 2010

(54) GOAL POSTS SIDE KEY IMPLEMENTATION SCHEME FOR OFFSET HINGE CLAMSHELL PHONE WITH THICKNESS FLIP HARDWARE COMPARTMENT

(75) Inventors: Rachid Alameh, Crystal Lake, IL (US); Thomas Gitzinger, Libertyville, IL (US)

(73) Assignee: Motorola, Inc., Schaumburg, IL (US)

( * ) Notice: Subject to any disclaimer, the term of this patent is extended or adjusted under 35 U.S.C. 154(b) by 199 days.

(21) Appl. No.: 12/361,682

(22) Filed: Jan. 29, 2009

(65) Prior Publication Data
US 2010/0188807 A1    Jul. 29, 2010

(51) Int. Cl.
H05K 7/16 (2006.01)
(52) U.S. Cl. ............... 361/679.21; 361/679.3; 361/679.56; 361/679.27; 455/575.3
(58) Field of Classification Search ............ 361/679.01, 361/679.21, 679.27, 679.3, 679.56; 248/917–924; 455/575.3, 575.1, 575.2, 575.4; 379/433.11–433.13; 400/472–496; 345/168–172
See application file for complete search history.

(56) References Cited

U.S. PATENT DOCUMENTS

2006/0063570 A1  3/2006  Nishimura
2007/0192990 A1  8/2007  Christensen
2010/0151923 A1 * 6/2010  Alameh et al. .......... 455/575.3

FOREIGN PATENT DOCUMENTS

IT    1439685 A1 * 7/2004

OTHER PUBLICATIONS

Publication: PCT International Search Report and Written Opinion of International Searching Authority, mailed on Mar. 26, 2010 for International Application No. PCT/US2010/022025, International Filing Date Jan. 26, 2010 for Applicant, Motorola, Inc.
International Publication No. WO 2008/142426 published Nov. 27, 2008, of O2 (UK) Limited, pertains to a Mobile Telecommunications Device, and Accessory for a Mobile Telecommunications Device.

* cited by examiner

Primary Examiner—Jayprakash N Gandhi
Assistant Examiner—Ingrid Wright
(74) Attorney, Agent, or Firm—Thomas W. Tolpin; Tolpin & Partners, PC

(57) ABSTRACT

A mobile phone or other electronic device is provided with side keys inside the goalpost compartment at a location offset from the axis of rotation to optimize the use of internal limited space inside the goalpost. In the preferred form, side keys comprise keycaps positioned in the goalpost area, while the switches are located inside the hardware compartment and engaged by the keycaps via a pin providing a cam.

20 Claims, 25 Drawing Sheets

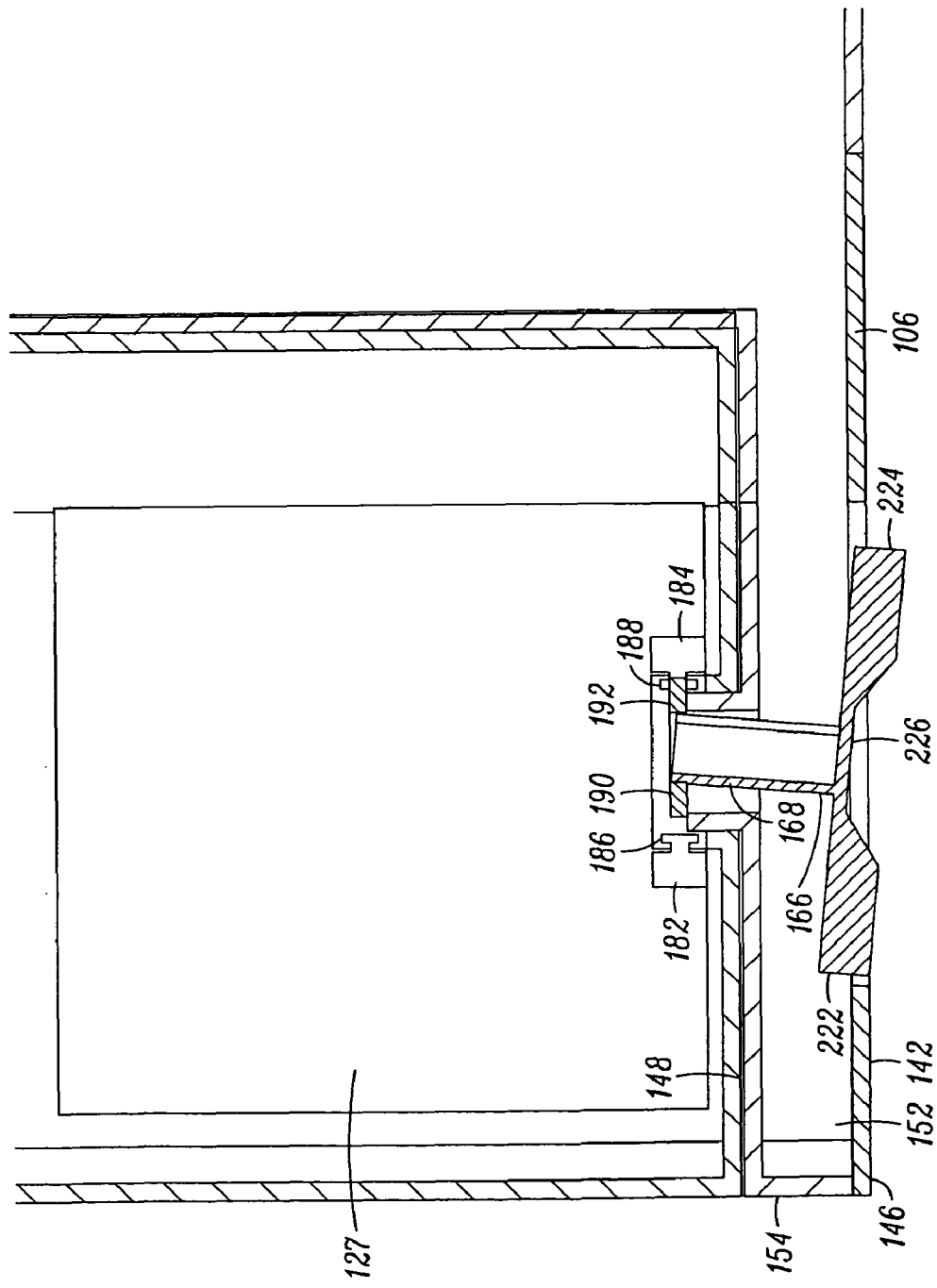

GOAL POSTS SIDE KEY IMPLEMENTATION SCHEME FOR OFFSET HINGE CLAMSHELL PHONE WITH THICKNESS FLIP HARDWARE COMPARTMENT

BACKGROUND OF THE INVENTION

1. Field of the Disclosure

The disclosure relates in general to electronic devices, and more particularly, to side keys for electronic devices having a clamshell configuration. In certain embodiments, the clamshell configuration comprises a mobile telephone, but the disclosure is not limited to mobile telephones.

2. Background Art

Electronic devices with goalposts have been used to route a flex between the base and flip of the electronic device. There is limited space in the goalposts to accommodate switches, buttons or side keys, and still have room to route the flex.

Electronic devices, such as mobile telephones and the like, include a number of different configurations. A clamshell configuration which includes a flip and a base that are hinged together at one side edge is a common type of configuration for electronic devices. Typically, the inner surfaces house an electronic display and a keyboard such that the electronic device must be pivoted or rotated to view and access the electronic display and keyboard.

Over the years various electronic devices have been suggested that operate with various degrees of success. Many conventional electronic devices have numerous complex structural parts and components and can be bulky. There are numerous interconnects between the flip and base of conventional clam phones. Such electronic devices can be difficult and expensive to manufacture.

It is, therefore, desirable to provide for an improved electronic device which overcomes most, if not all, of the preceding problems.

SUMMARY OF THE INVENTION

An improved electronic device is provided that is user-friendly, reliable, and effective. The novel electronic device is simple to use, easy to manufacture and economical. The compact electronic device can be an electronic device with a clamshell configuration, a radiotelephone, a cellular (cell) phone, a mobile phone, smart phone, qwerty flip device, wireless device, mobile communications device, personal digital assistant (PDA), wireless e-mail device, a two way pager, or other hand held electronic device.

In the improved electronic device, a scheme is provided in which the side keys are placed inside the goalpost compartment at a location offset from the rotation axis to optimize the use of internal limited space inside the goalpost. In the preferred form, keycaps are positioned in the goalpost area while the switches are located inside the hardware compartments and engaged by the keycaps via a pin.

In one embodiment, side keys can be placed above, below or either side of an offset hinge axis inside the goal post space. In order to attain more compact thinner electronic devices with thinner goalpost space, keycaps can be placed in the goalpost and actual switches are inside the hardware compartment and acted on by a pin. The user can press one or more of the key caps that are located on the goalpost of the base housing. The actual switch for detecting the switch (key press) can be in the flip with the rest of the electronics.

A cam mechanism can be provided so that the travel distance of a sliding (slider) switch or sliding key can be the same when the flip is open or closed. The reason for this is that in the closed position, the board upon which the switches are positioned in the flip can be parallel to the direction of the sliding key on the base. When the flip is opened, the board can be at a 10 to 30 degree angle dependent on the design of the phone or other electronic device. The distance the sliding key would have to slide to engage the switch is more in the closed position than in the open position, if nothing is done. This technique can apply for rocking (rocker) switches or rockable side keys.

A hollow pin can be provided that routes the flex and also acts as a switch activator.

Incorporating side keys into the flip and having one or more keycaps activate switches in the portion of the electronic device where the engine board resides, helps reduce the number of interconnects between the flip and the base and facilitates a thinner design of the electronic device. Additional benefits and advantages of the invention further include: space savings achieved by not placing the switches in the goalposts. Also, the flex can run through the hinge or pin and the arrangement would be simpler by not placing the switches in the goalpost. Furthermore, the flex can be less expensive and more reliable in use and assembly in the electronic device of this invention. Moreover, the can be less appendages on the flex with no components to break off.

The novel electronic device can comprise an offset hinge that pivotally connects a flip to a base. The flip can provide a top and cover of the electronic device. The flip can also comprise a first housing having an inward upper surface, an outward upper surface and an upper edge which connects the inward upper surface and the outward upper surface. The flip can further include a hardware compartment. At least one of the upper surfaces of the first housing can include a screen which provides an electronic display that can be located longitudinally from the hardware compartment.

The base can provide a bottom for manually grasping (gripping) the electronic device. The base can also comprise a second housing having an inward lower surface, an outward lower surface and a lower edge which connects the inward lower surface and the outward lower surface. The base can have a keyboard section and goalposts which extend longitudinally from the keyboard section. The inward lower surface of the keyboard section can include a keyboard comprising qwerty keys, a keypad, or a touch screen. The hardware compartment can be thicker than the keyboard section. The goalposts can have an exterior side and defines a cutout (cutaway) area which provides an opening to receive the hardware compartment. This arrangement allows the hardware compartment to be aligned between the goalposts when the electronic device is in the closed position and in the open position. Preferably, at least one of said goalposts has a substantially hollow interior with a closed end.

In the preferred form, the offset hinge extends substantially transversely across the goalposts for pivotally connecting the flip to the base along an axis of rotation so that the flip can be moved from a closed position on top of the base to a open position with the flip opened at an angle of inclination relative to the base.

In preferred forms, the electronic device includes a switch and at least one side key position along and extending into the hollow interior of the goalpost for engaging the switch. The side key can be positioned along the goalpost at a location: (a) spaced above and offset from the axis of rotation of the hinge when the flip is in the closed position, or (b) below the axis of rotation and between the electronic display of the flip and the axis of rotation of the hinge when the flip is in the closed position. The side key can comprise a cap. If desired, two or more side keys can be positioned on both sides of the axis of rotation of the hinge. The flex can positioned and routed in the goalpost for connecting the base and the flip. The switch can be located in the hardware compartment or hollow interior of the goalpost. Preferably, the switch is spaced from and positioned in offset relationship to the axis of rotation of the hinge.

In another preferred form, at least one printed circuit board and at least one key switch are positioned in the hardware compartment at a location spaced away from the goalposts. The key switch can comprise a button disposed in proximity to the printed circuit board (engine board). At least one movable side key comprising a keycap can be positioned along the exterior outer side of one of the goalposts and can extend into the hollow interior of that goalpost. The side keys can be moveable from a neutral inactive position to at least one activated positions. The keycap can be comprises: a slidable (sliding) cap, a rotatable (rotating) cap, a pivotable (pivoting) keycap, or a rockable (rocking) cap, or a combination of any the preceding. Preferably, the side key comprises a pin which provides a cam that extends axially inwardly from the keycap through the hollow interior of that goalpost into the hardware compartment. The pin can comprise: a shaft, a stem, a cylindrical pin, a circular pin, an oval pin, a C-shaped pin, a tubular pin, a hollow pin, a side key actuator pin, an actuator pin, or a switch activator, or a combination of any of the preceding. The pin can also be disposed in proximity to the flex. At least one cam plate which provides an actuator can be positioned in the hardware compartment. The cam plate can comprise a body section with a concave rounded pin-engaging section to engage and receive the pin. The cam plate can engage the button of the switch when the side key is moved to an activated position.

The novel electronic devices as described and claimed herein achieve unexpected surprisingly good results.

A more detailed explanation of the invention is provided in the following description and appended claims.

BRIEF DESCRIPTION OF THE DRAWINGS

FIG. 35 is a top cross-sectional interior view of a portion of the electronic device with a rotating keycap.

DETAILED DESCRIPTION OF THE INVENTION

Figure 1:
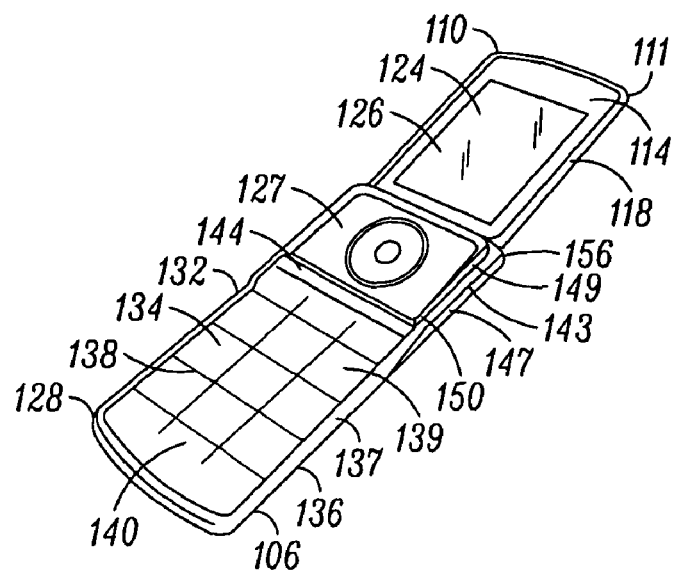
FIG. 1 is a perspective view of an electronic device in accordance with principle of the present invention of the present disclosure shown in an open position.
Figure 2:
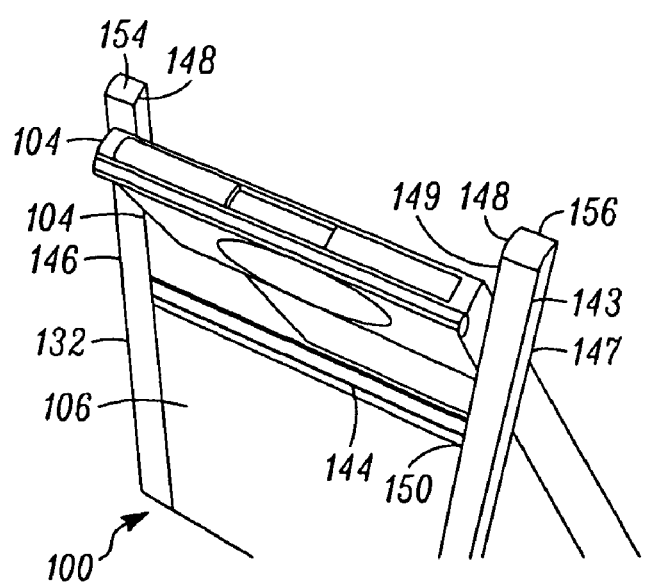
FIG. 2 is a longitudinal perspective view of the goalposts and other positions electronic device shown in the closed position.
Figure 3:
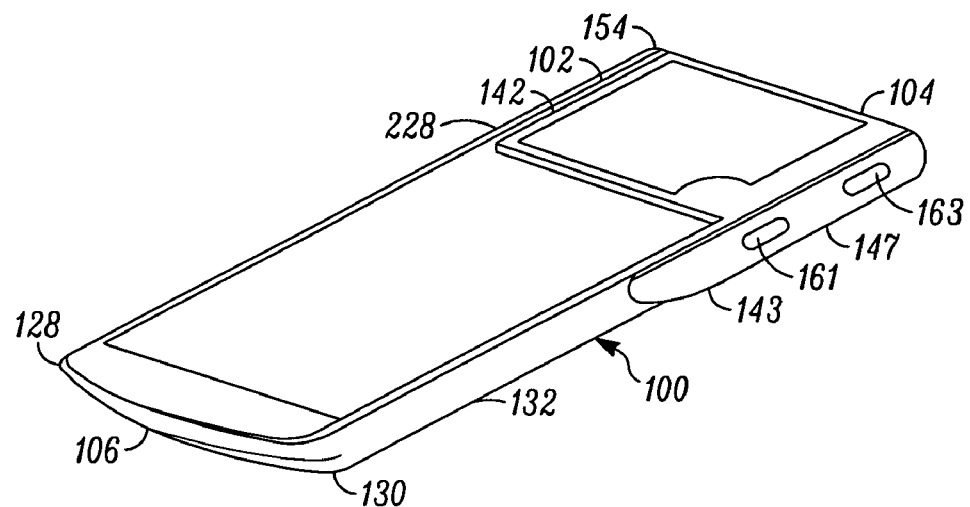
FIG. 3 is a perspective view of the electronic device shown in a closed position.
Figure 4:
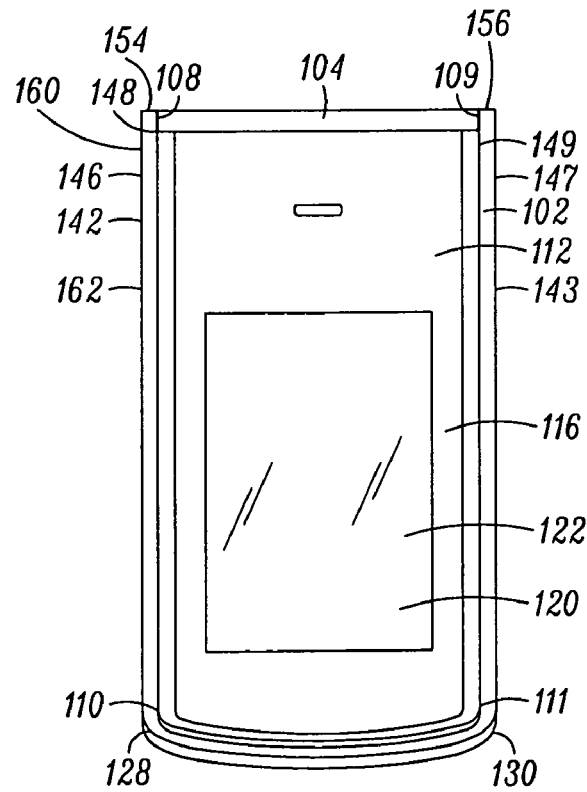
FIG. 4 is a front view of the electronic device shown in the closed position.
Figure 5:
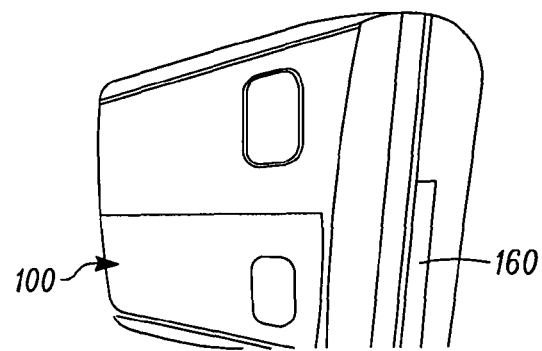
FIG. 5 is a perspective view of an electronic device with a hardware compartment and side keys.

The following is a detailed description of the preferred embodiments and best modes for practicing the invention.

While this invention is susceptible of embodiment in many different forms, there is shown in the drawings and described herein in detail specific embodiments with the understanding that the present disclosure is to be considered as an exemplification and is not intended to be limited to the illustrated embodiments.

It will be understood that like, similar or analogous parts, structural elements and/or components, referred to herein, may be identified throughout the drawings by like reference characters. Furthermore, it will be understood that the drawings are merely schematic representations of the invention, and some of the parts and components may have been distorted from actual scale for purposes of pictorial clarity.

Referring to the drawings, a compact light weight, and portable user-friendly electronic device 100 is provided with an offset friction hinge 102 (friction hinge assembly) (FIGS. 1-4 and 9). The friction hinge pivotally connects and couples the flip 104 to the base 106 of the electronic device.

The electronic device can be wireless device, mobile communications device, personal digital assistant (PDA), wireless e-mail device, a two way pager, or other hand held electronic device and is preferably an electronic device with a clamshell configuration, a radiotelephone, a cellular (cell) phone, a mobile phone, smart phone, qwerty flip device or a combination of any of the preceding.

The flip 104 (FIG. 4) can provide a top and cover of the electronic device. The flip can be generally rectangular with upper corners 108 and 109 and lower rounded corners 110 and 111. The flip can comprise an upper first housing 112 (first housing element) having an inward upper surface 114 (FIG. 1), an outward upper surface 116 (FIG. 4) and an upper generally rectangular peripheral side edge 118 which provides an upper periphery that connects the inward upper surface and the outward upper surface. The outward upper surface of the upper first housing can include an outer display screen 120 (FIG. 4) which can provide an outer electronic display 122. The inward upper surface of the upper first housing can include an inner display screen 124 (FIG. 1) which can provide an inner electronic display 126. The flip can have a hardware compartment 127 (FIG. 1) that is positioned longitudinally away from the inner and outer display screens.

The base 106 (FIG. 1) of the electronic device can provide a bottom for manually grasping (gripping) the electronic device. The base can be generally rectangular with corners 128 and 130. The base can comprise a lower second housing (second housing element) 132 having an inward lower surface 134, an outward lower surface 136 and a lower generally rectangular peripheral side edge 137 which provide a lower periphery that connects the inward lower surface and the outward lower surface. The inward lower surface of lower second housing element can include a keyboard compartment 138 with keyboard 139 having alpha numeric keys 140.

Figure 6:
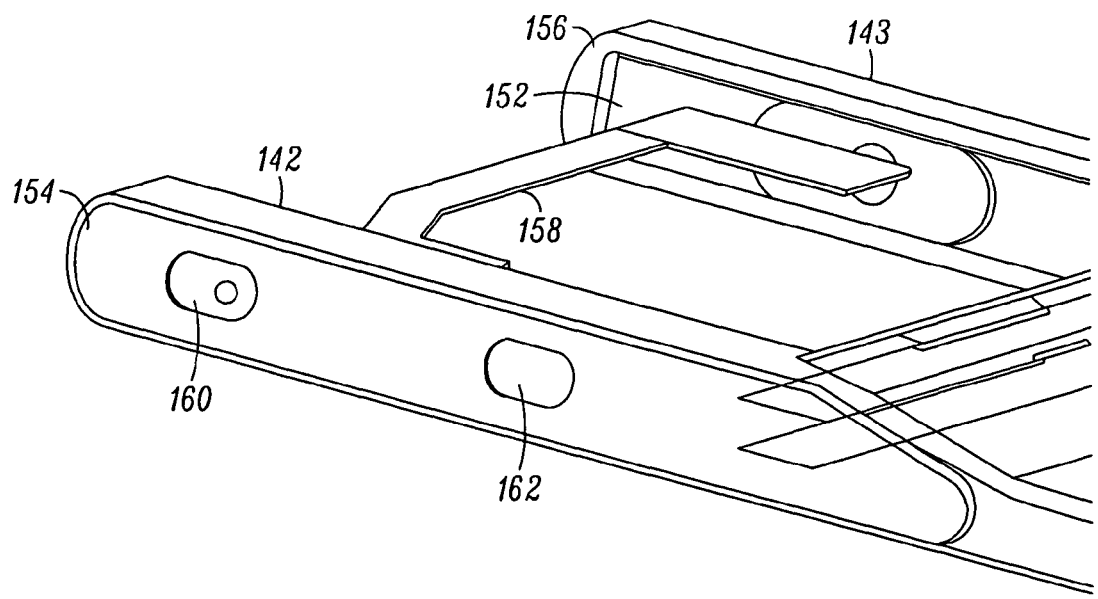
FIG. 6 is an enlarged top interior perspective view of part of an electronic device with side keys incorporated into one of the goalposts.
Figure 7:
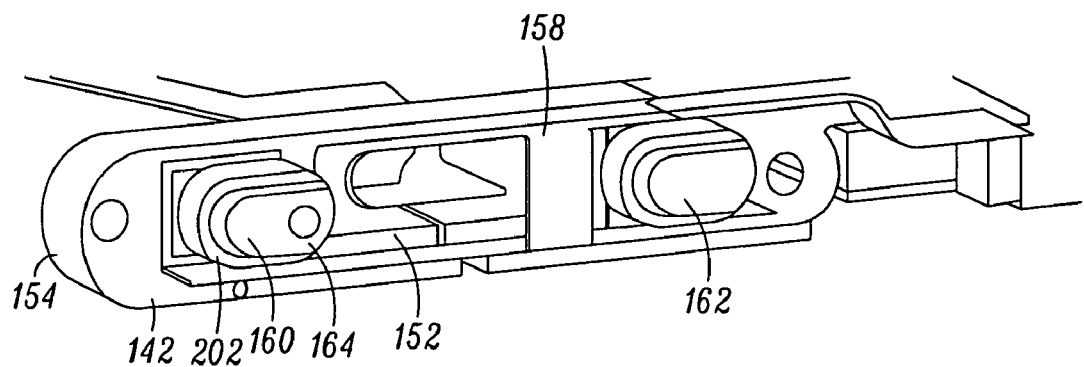
FIG. 7 is an enlarged interior perspective view of the electronic device of FIG. 6 with portions cutaway for ease of understanding and clarity.
Figure 8:
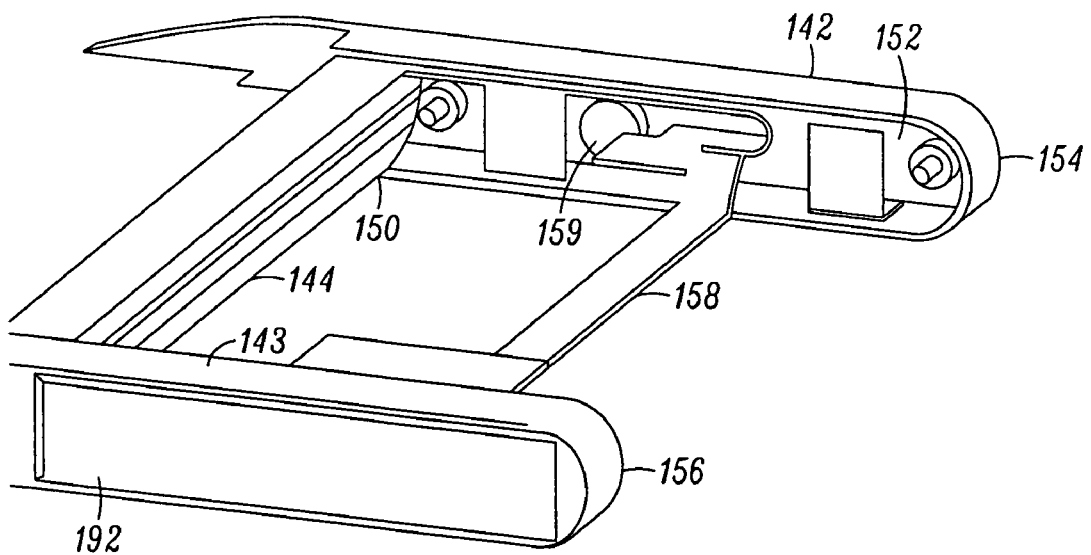
FIG. 8 is an enlarged bottom interior perspective view of part of the electronic device of FIG. 6 illustrating the flex routing in the goalpost and side key implementation.
Figure 19:
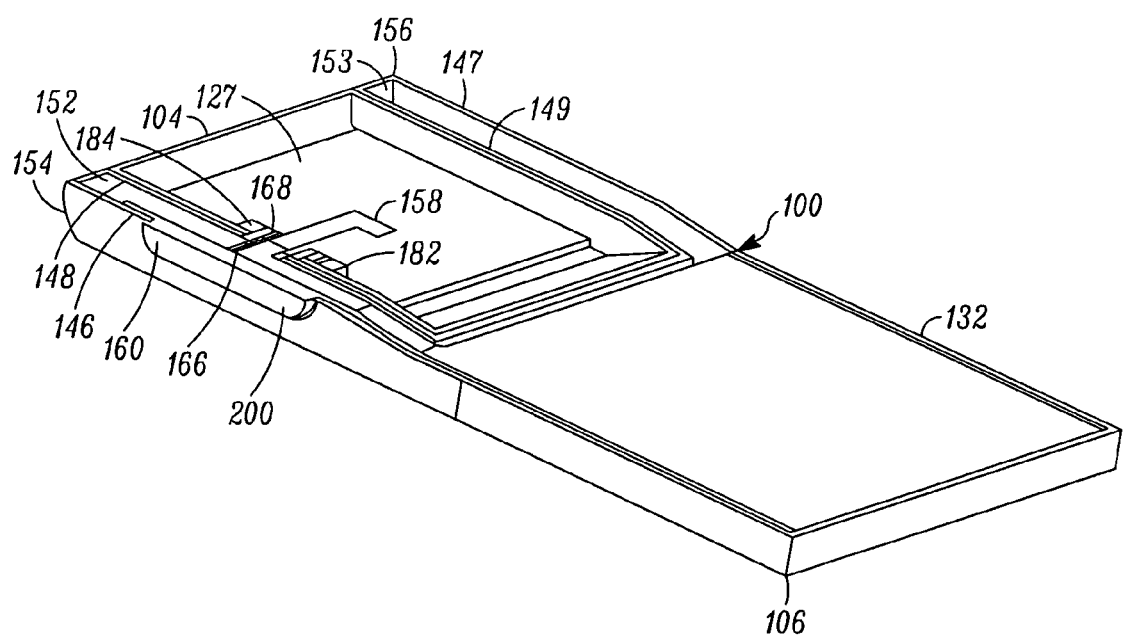
FIG. 19 is a cross-sectional perspective view of the electronic device shown in FIG. 18 with portions remove for ease of understanding and clarity.
Figure 20:
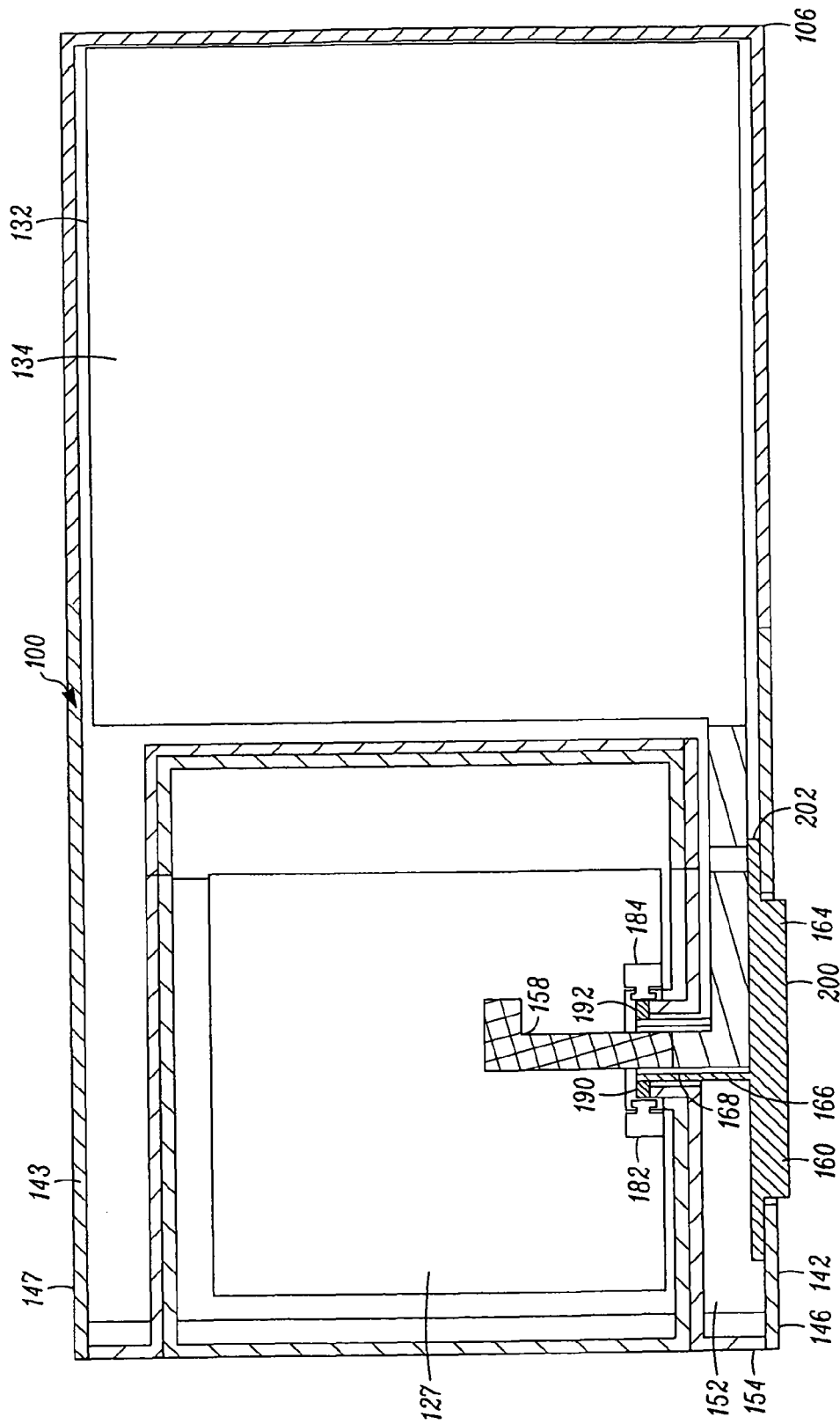
FIG. 20 is a cross-sectional top view of the electronic device shown in FIG. 18 with portions remove for ease of understanding and clarity.
Figure 21:
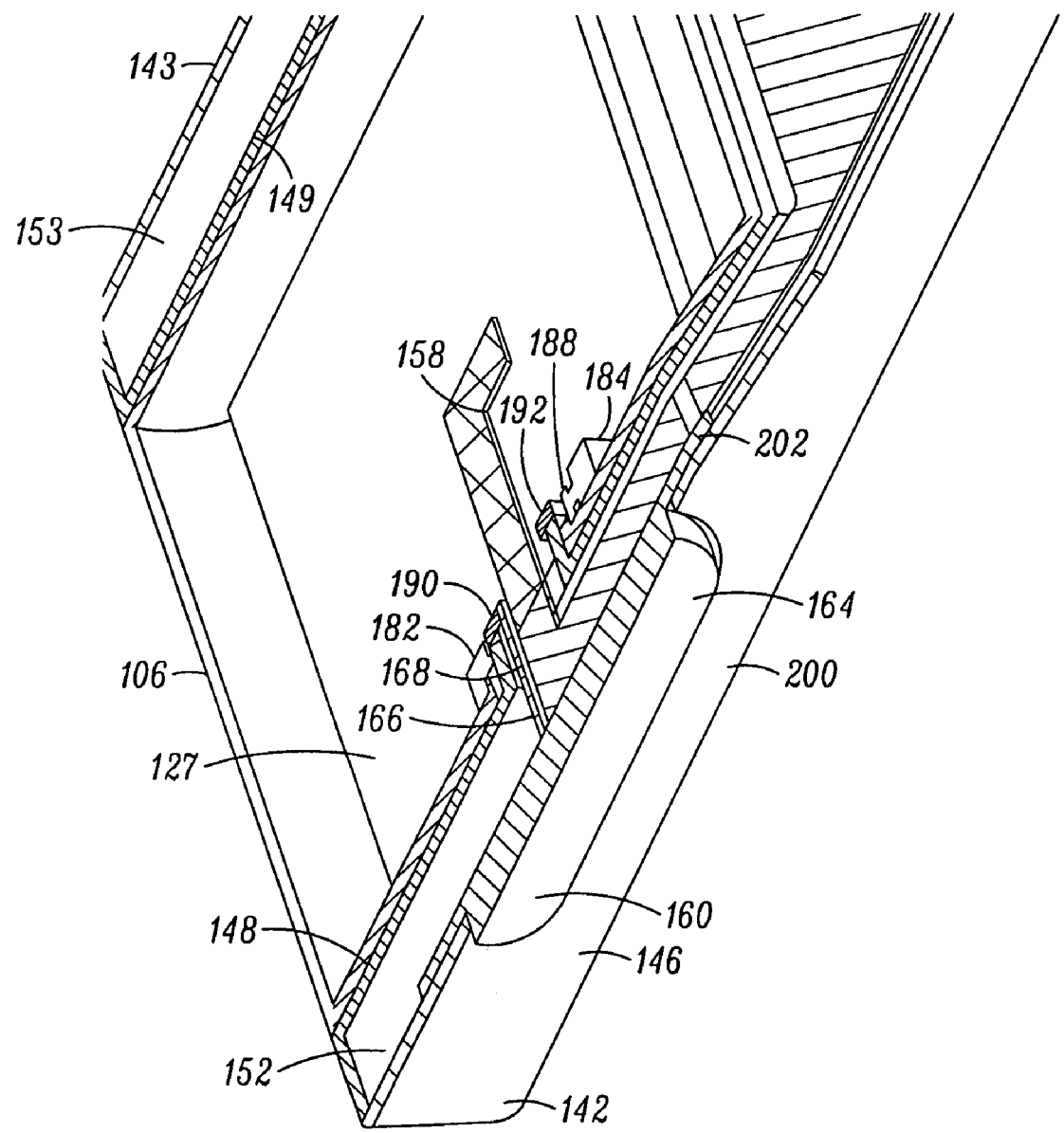
FIG. 21 is an enlarged cross-sectional perspective view of portions of the electronic device shown in FIG. 19.
Figure 22:
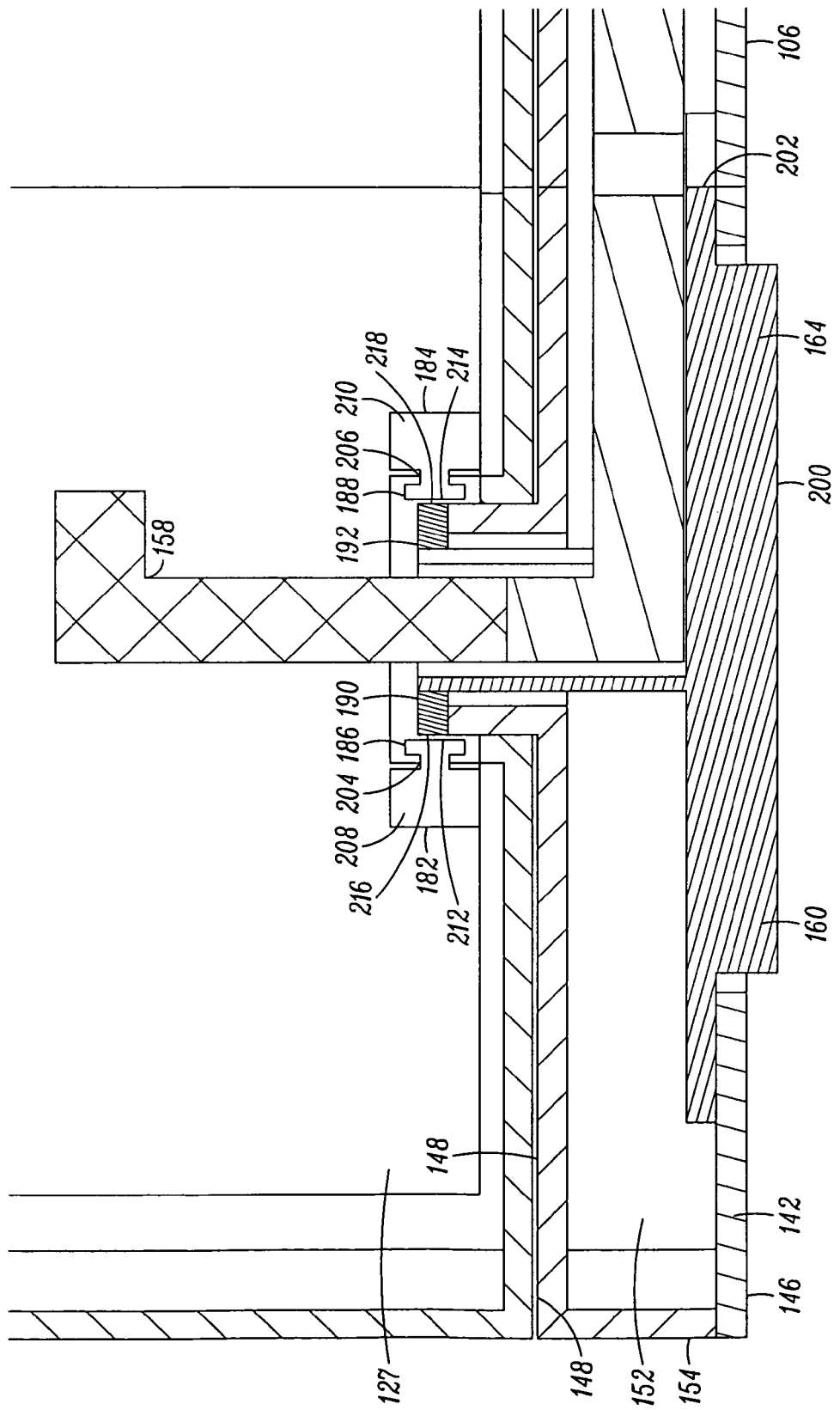
FIG. 22 is an enlarged cross-sectional top view of portions of the electronic device shown in FIG. 21, when the keycap is in a neutral position and when the buttons of the key switches are not activated.
Figure 23:
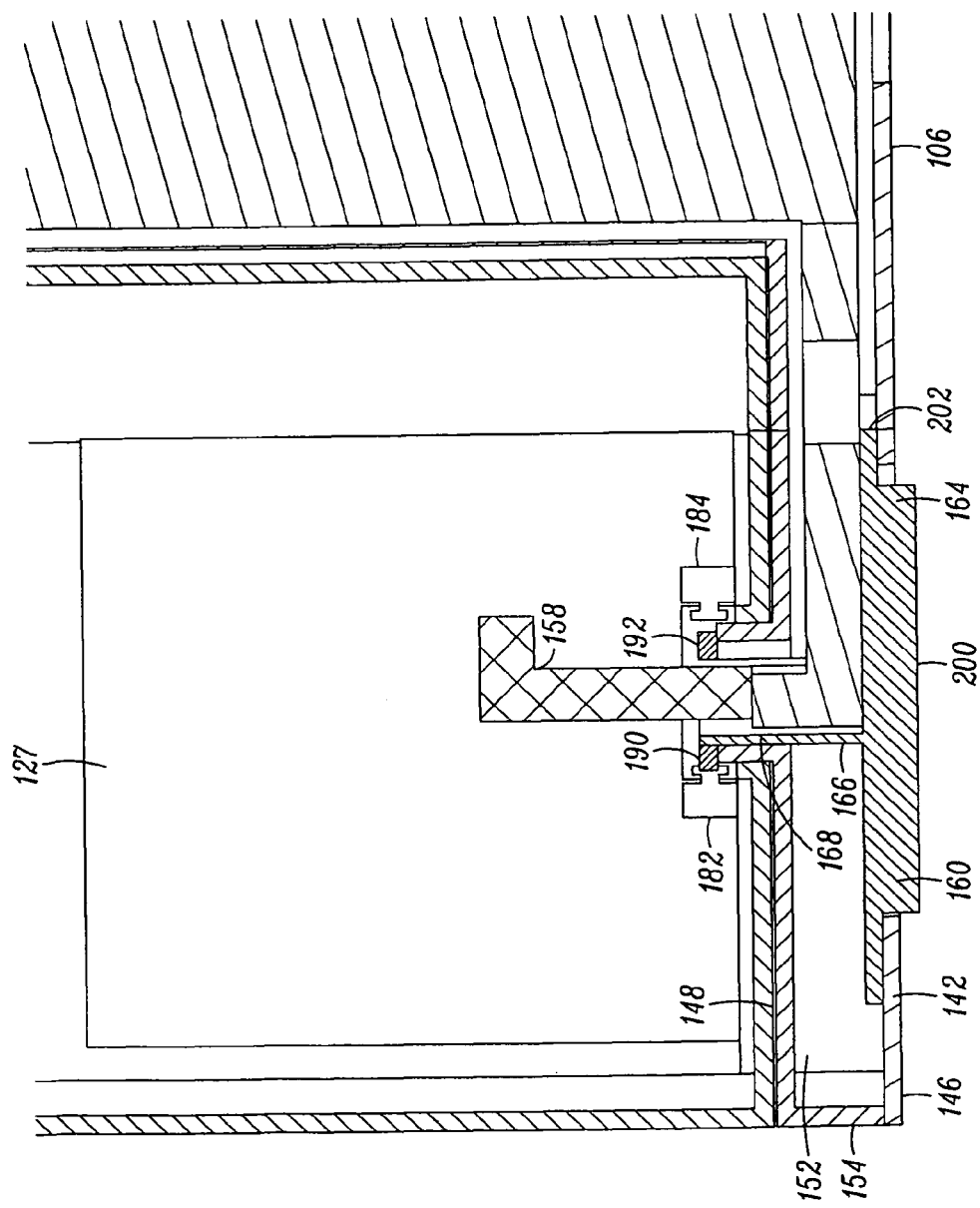
FIG. 23 is a cross-sectional top view of portions of the electronic device similar to FIG. 22, when the left button of the key switches is activated with keycap slid to the left.
Figure 24:
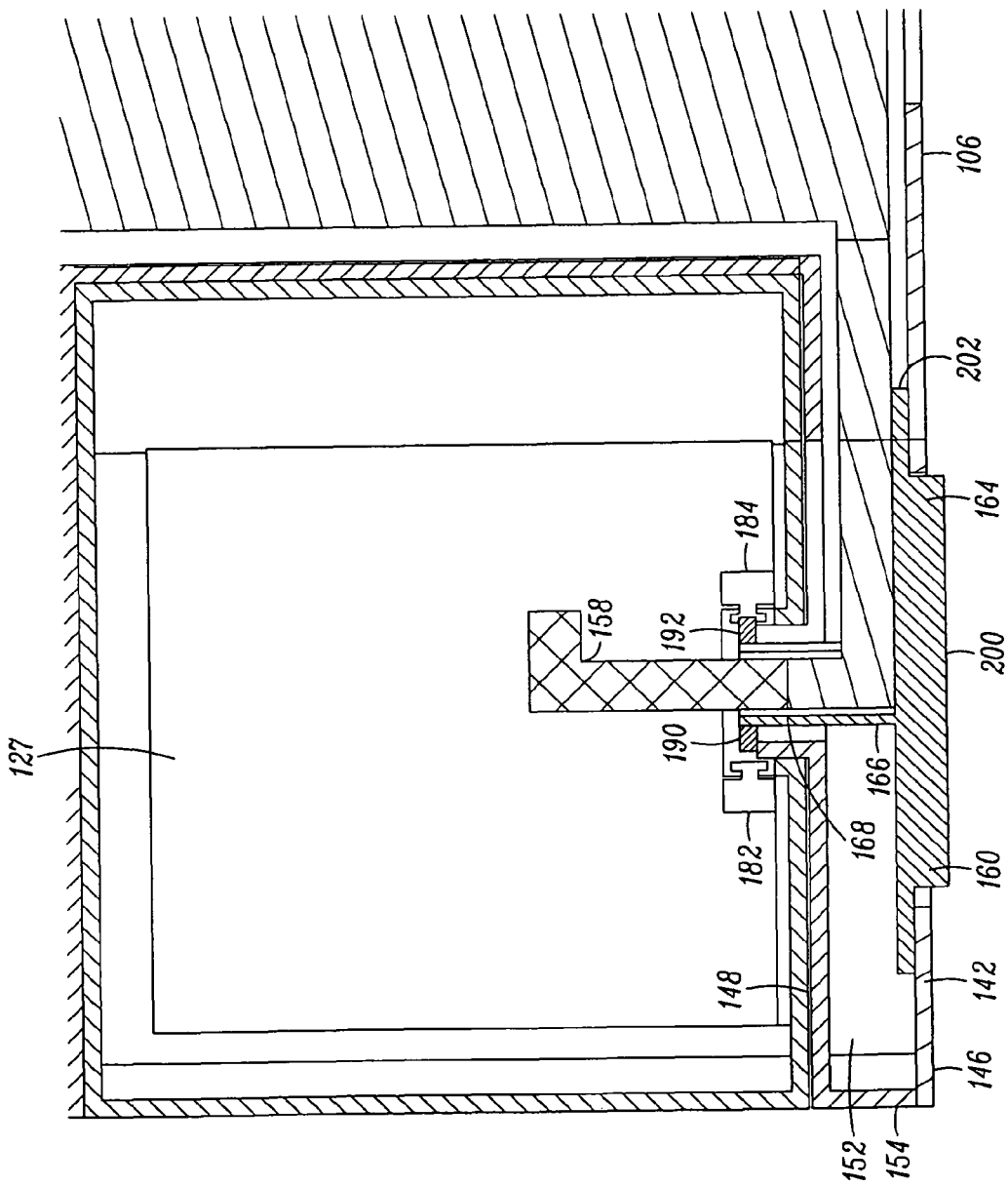
FIG. 24 is a cross-sectional top view of portions of the electronic device similar to FIG. 22, when the right button of the key switches is activated with keycap slid to the right.
Figure 25:
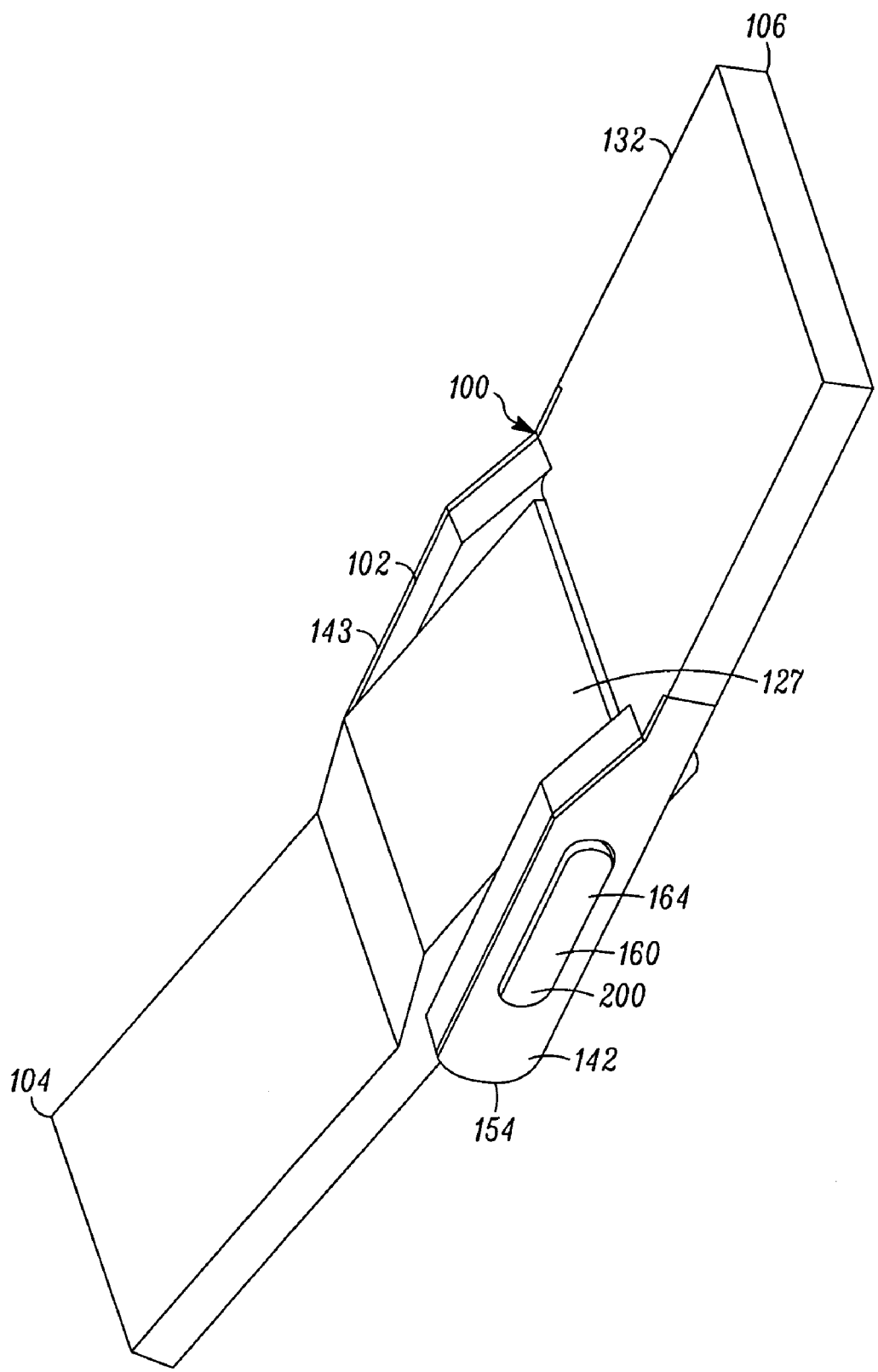
FIG. 25 is another perspective view of the electronic device shown in an open position.
Figure 26:
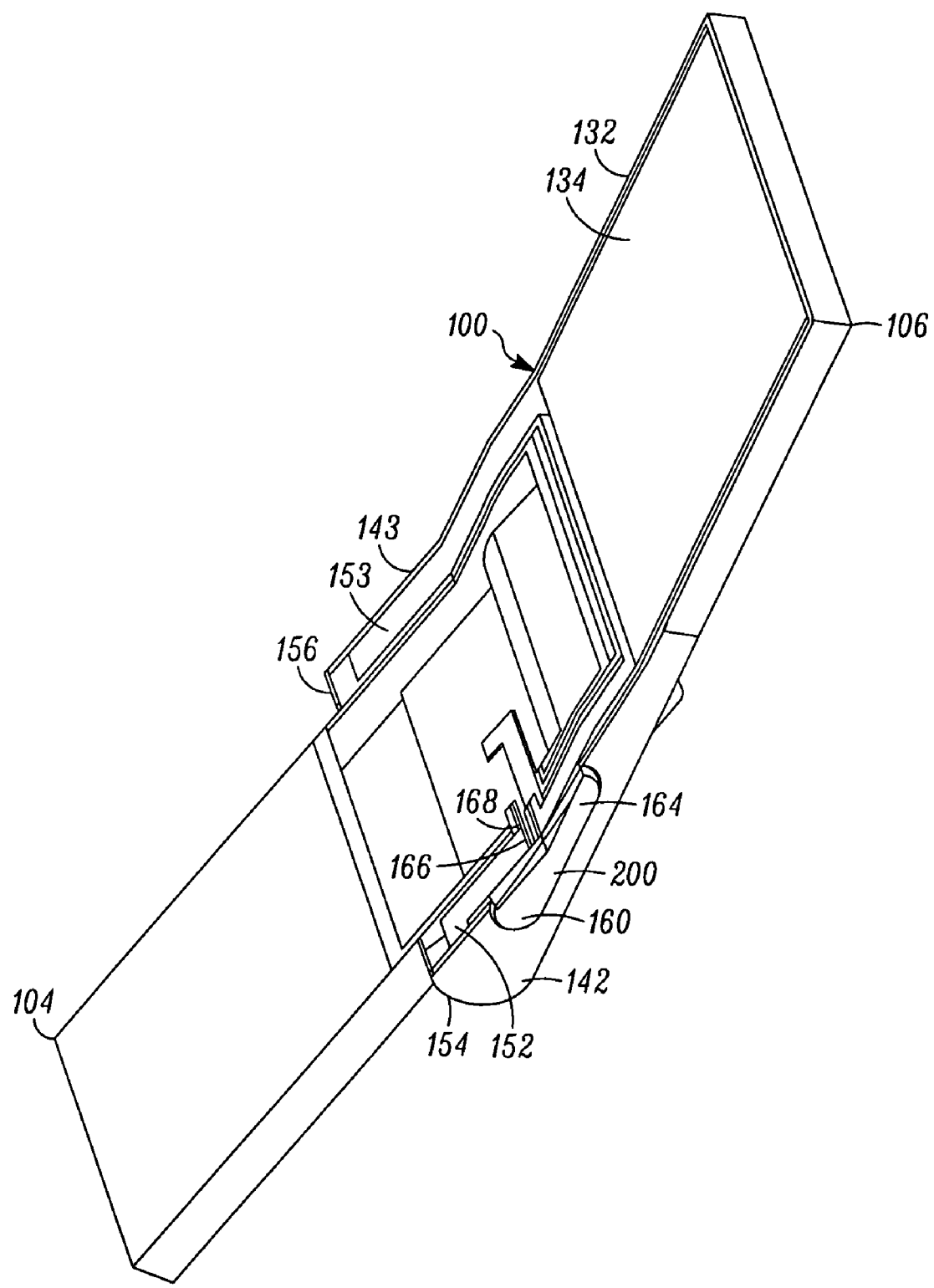
FIG. 26 is a cross-sectional perspective view of the electronic device shown in FIG. 25 with portions removed for ease of understanding and clarity.
Figure 27:
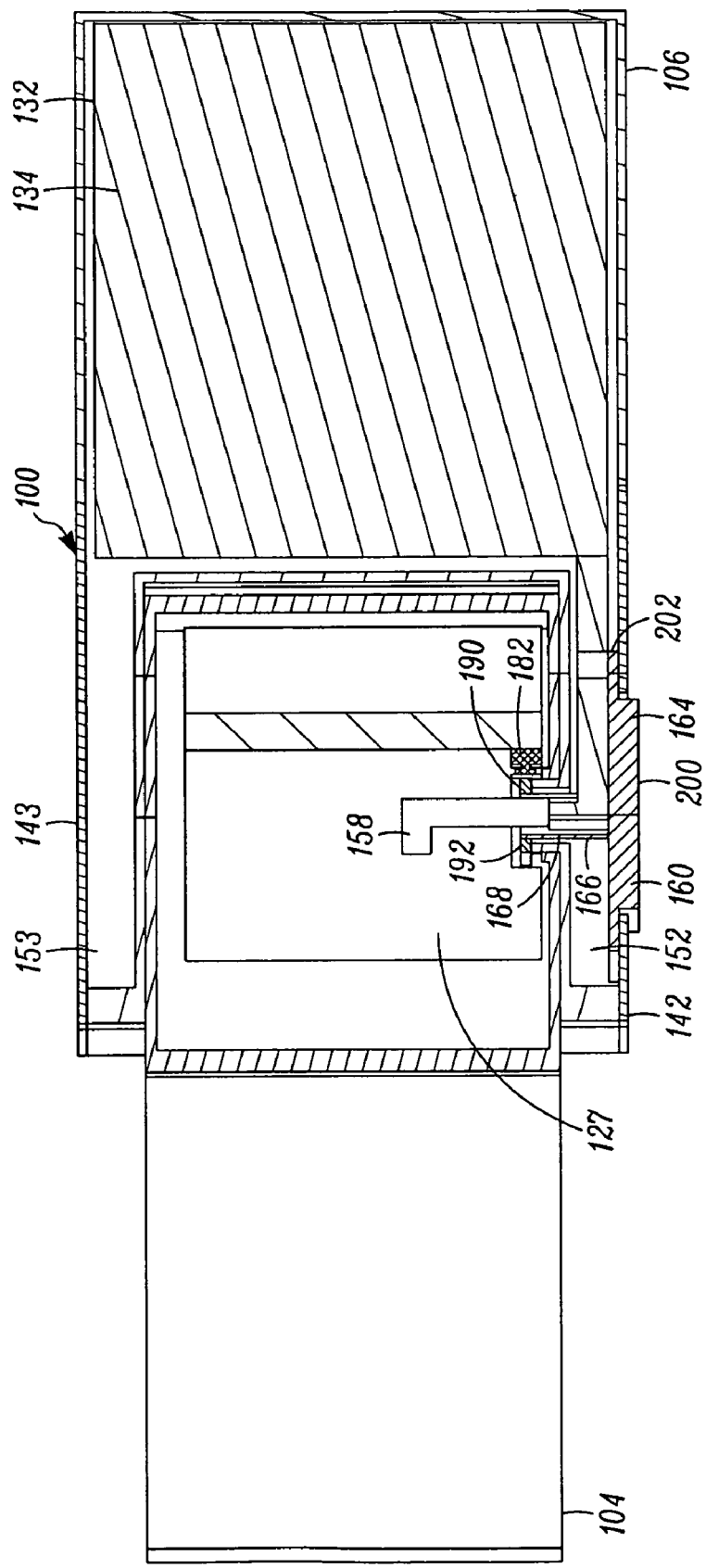
FIG. 27 is a cross-sectional top view of the electronic device shown in FIG. 26.
Figure 28:
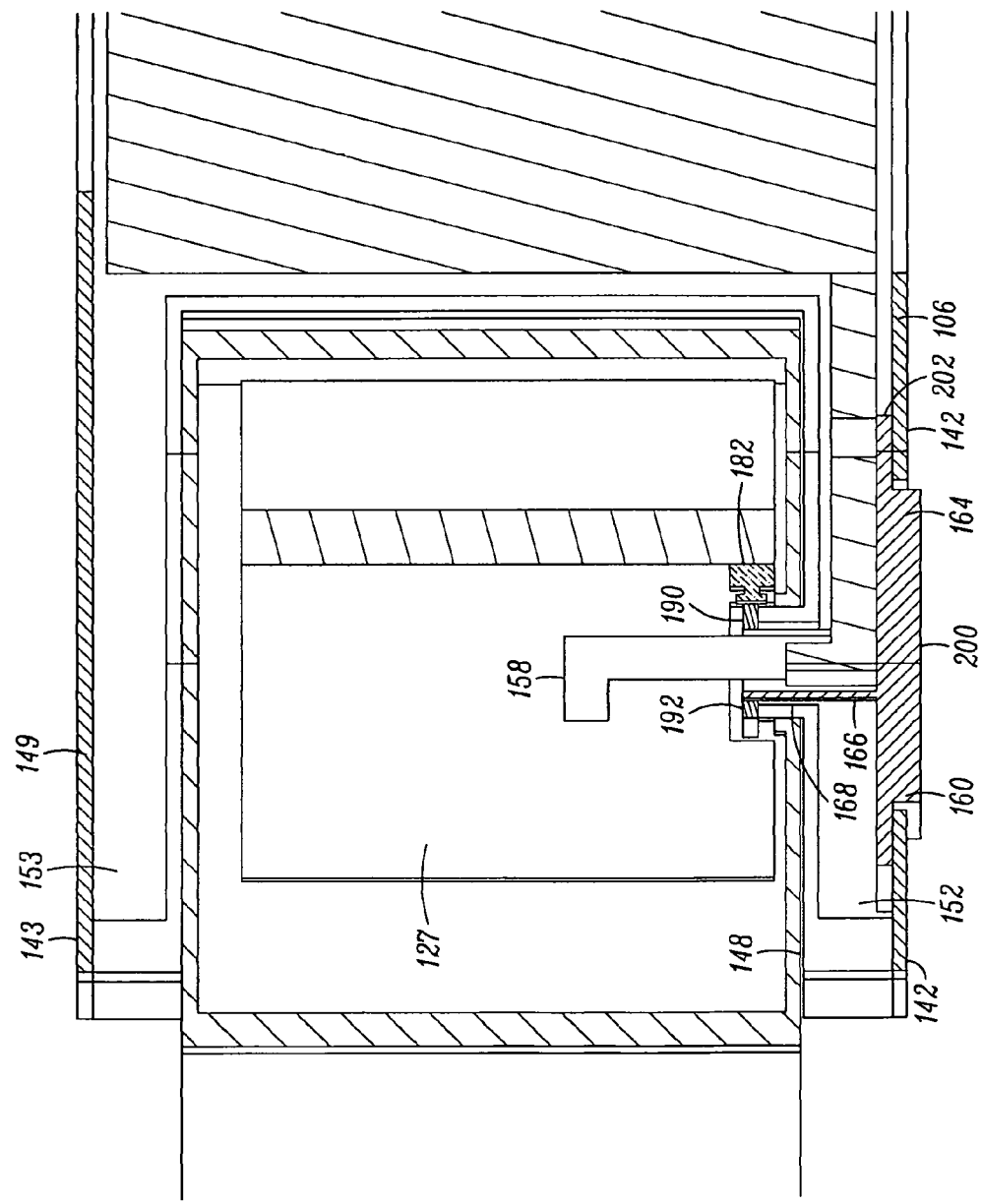
FIG. 28 is an cross-sectional top view of portions of the electronic device shown in FIG. 27, when the keycap is in a neutral position and the buttons of the key switches are not activated.
Figure 29:
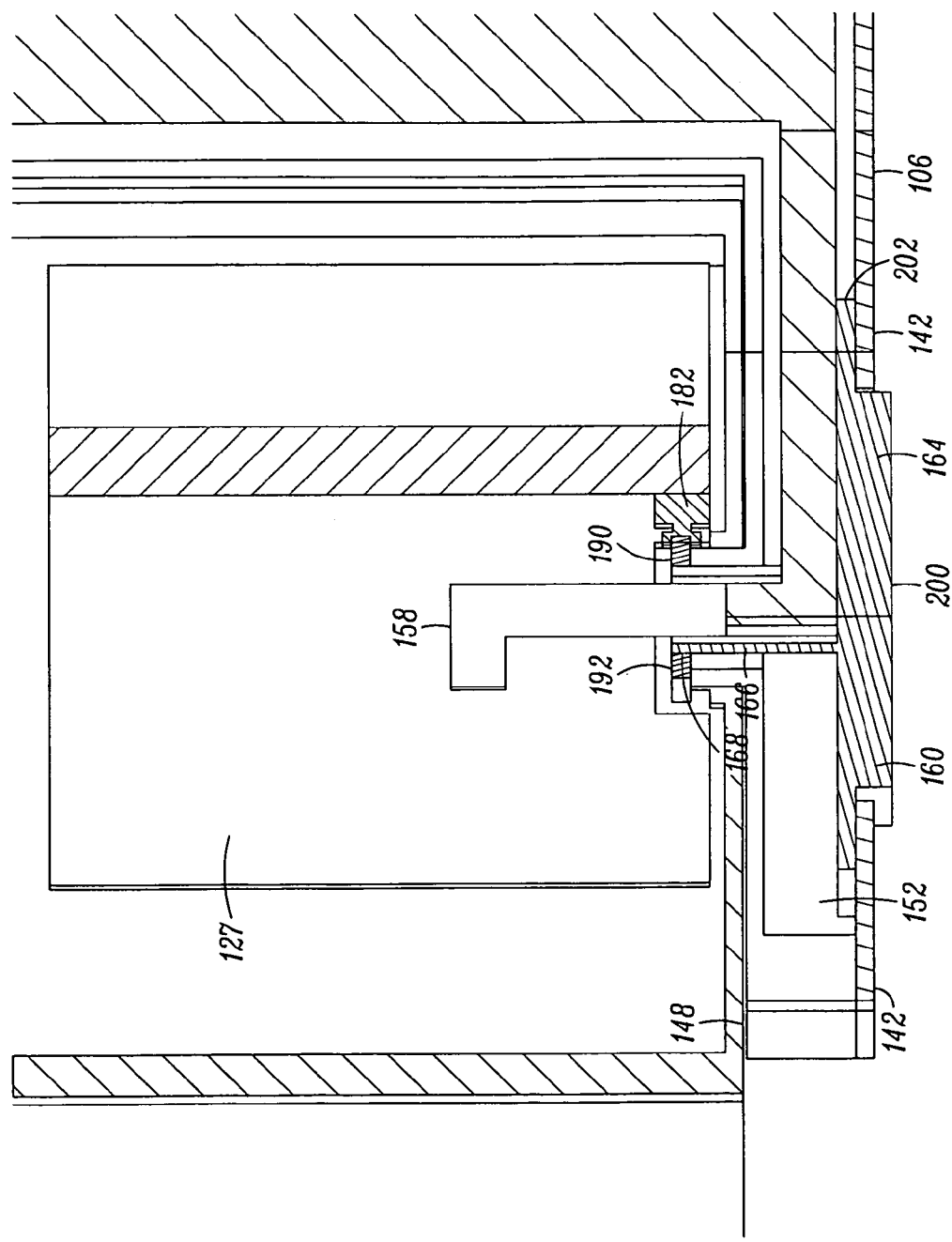
FIG. 29 is a cross-sectional top view of portions of the electronic device similar to FIG. 27, when the right button of the key switches is activated with keycap slid to the right.
Figure 30:
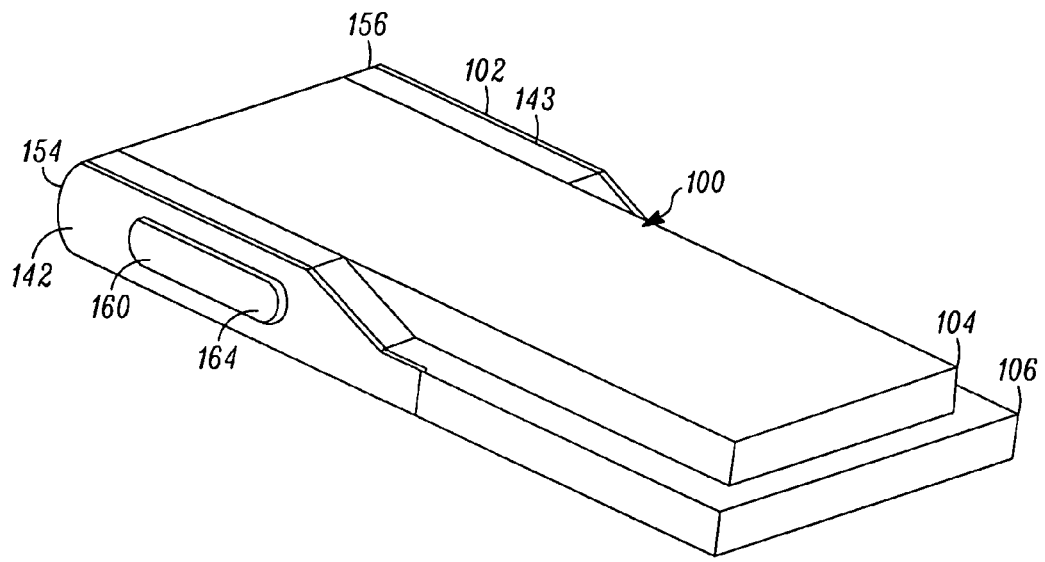
FIG. 30 is another perspective view of the electronic device shown in a closed position.
Figure 31:
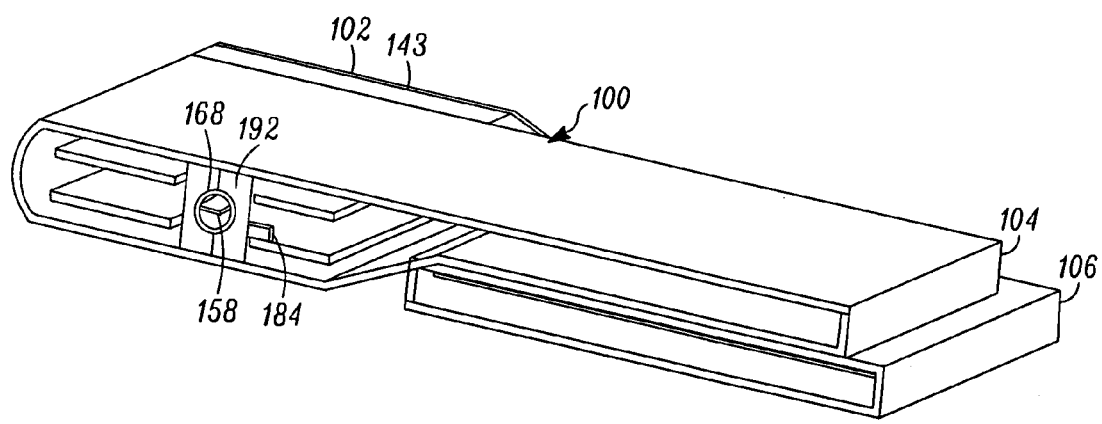
FIG. 31 is a cross-sectional perspective view of the electronic device shown in FIG. 30.
Figure 32:
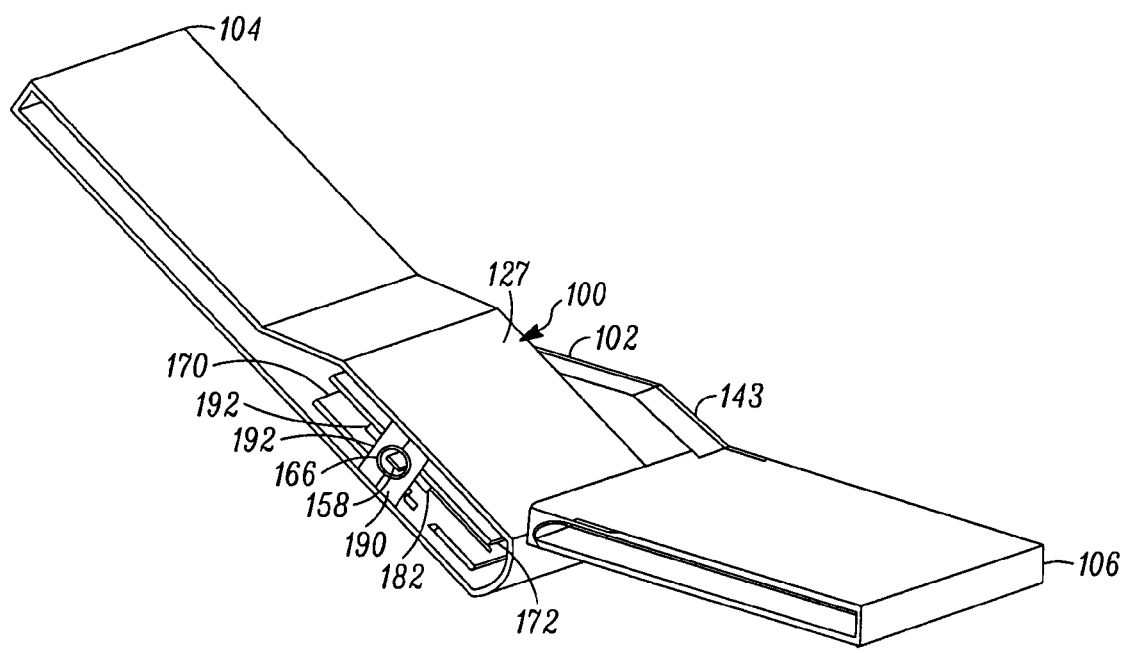
FIG. 32 is a cross-sectional perspective view of the electronic device of FIG. 30, but with the flip in the open position.

The base can have parallel elongated goalposts 142 and 143 (FIGS. 1 and 2) which can extend longitudinally forwardly of the lower edge and the keyboard section. The goalposts can be connected to and cantilevered from the lower edge of the base. A crossbar 144 can extend substantially transversely between and across and connect the goalposts. The goalposts can have exterior outer sides 146 and 147 and inner sides 148 and 149. The inner sides of the goalposts can cooperate with the crossbar of the base to define a cutout area 150 for providing an opening to receive the hardware compartment of the flip. The hardware compartment can be aligned and positioned between the goalposts when the electronic device is in the closed position and in the open position. The goalposts each have a substantially hollow interior 152 and 153 (FIGS. 19 and 26) with a closed end 154 (FIGS. 1 and 2) providing a rounded tip 156. A flex 158 (FIGS. 6-8) can be positioned in the hollow interior of at least one of the goalposts and extend to connect the base to the flip. The flex can also extend through the hinge. The other goalpost can contain a spring-loaded mechanism to hold the phone or other electronic device in an open or closed position. A magnet (FIG. 8) can be positioned in the hollow interior of at least one of the goalposts.

The offset friction hinge can comprise a hinge pin and can extend transversely across the goalposts at a position spaced from and parallel to the crossbar to pivotally connect the flip to the base along an offset axis of rotation. The flip can be pivoted and moved via the hinge from a closed position on top of the base to an open position with the flip opened at an angle of inclination ranging from about 150 degrees to about 180 degrees relative to the base. The flex can extend along a portion of the hinge.

Figure 9:
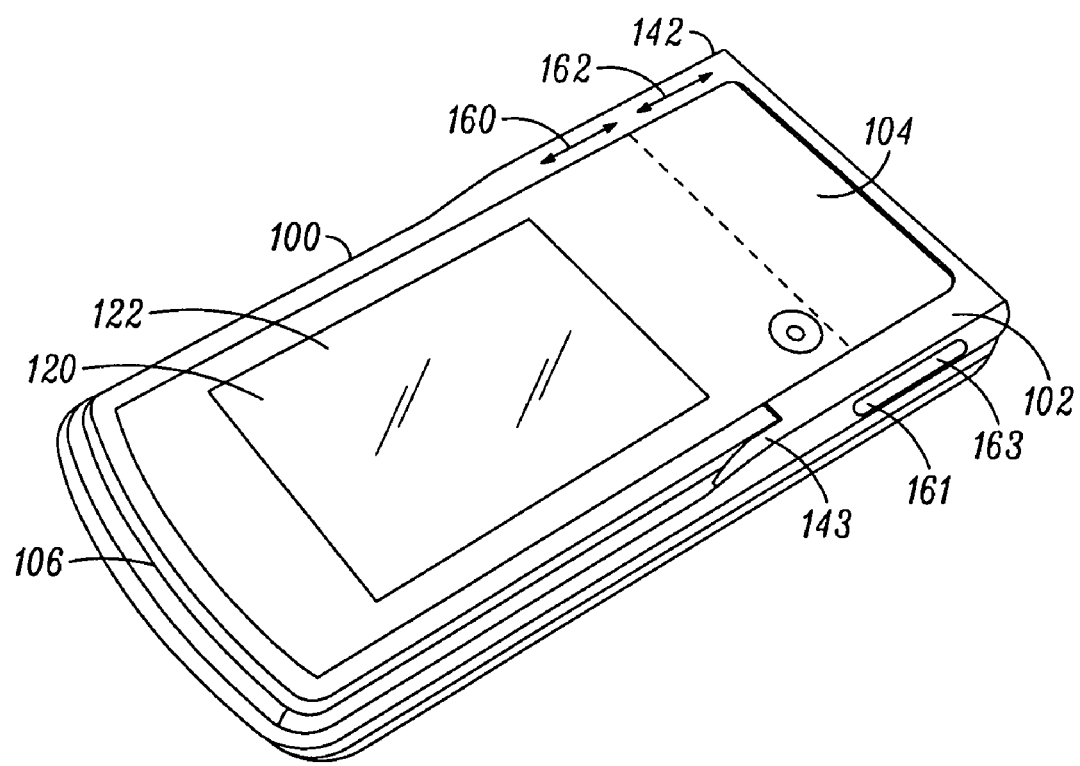
FIG. 9 is another perspective view of the electronic device shown in a closed position.

As shown in FIG. 9, moveable side keys 160-163 can be positioned along the goalpost at a location: (a) spaced above and offset from the axis of rotation of the hinge when the flip is in the closed position, and/or (b) below the axis of rotation and between the electronic display of the flip and axis of rotation of the hinge when the flip is in the closed position. If desired, two or more side keys can be positioned on both sides of the axis of rotation of the hinge. The flex can positioned and routed in the goalpost and through the hinge for connecting the base and the flip. Switches can be located in the hardware compartment or hollow interior of the goalpost. Preferably, the switches are spaced from and positioned in offset relationship to the axis of rotation of the hinge.

Figure 10:
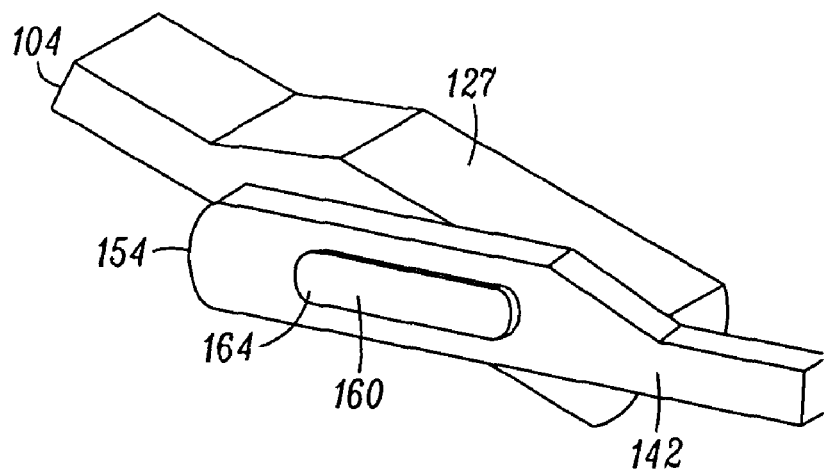
FIG. 10 is an enlarged perspective view of the keycap, goalpost and flip in the open position.
Figure 11:
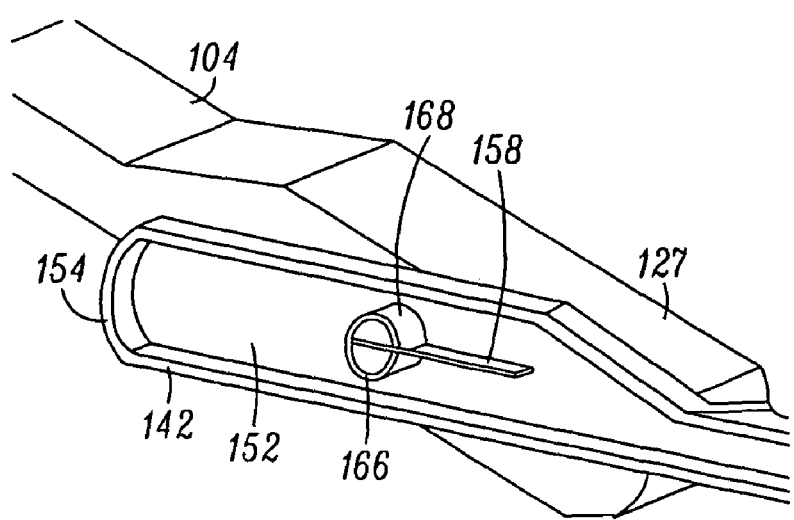
FIG. 11 is an enlarged perspective view similar to FIG. 10, but illustrating the pin and flex with the exterior outer side of the goalpost removed for ease of understanding and clarity.
Figure 12:
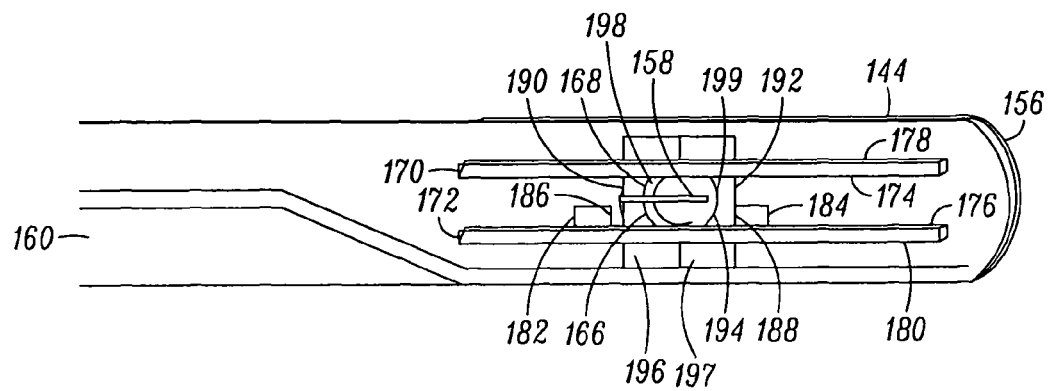
FIG. 12 is an enlarged perspective interior view of the base and flip in the closed position in an electronic device when the forward (upper) key switch is activated and illustrating the printed circuit boards (PCB), pin, actuator plates and flex.
Figure 13:
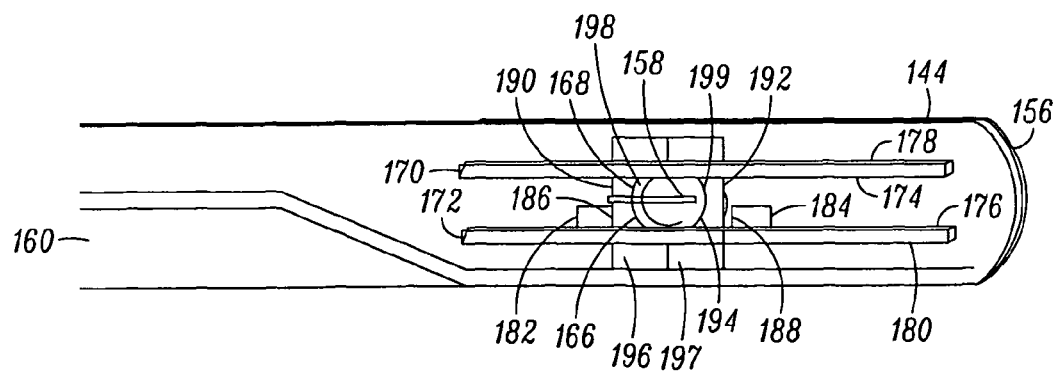
FIG. 13 is an enlarged perspective view similar to FIG. 12, but with the rearward (lower) key switch activated.
Figure 14:
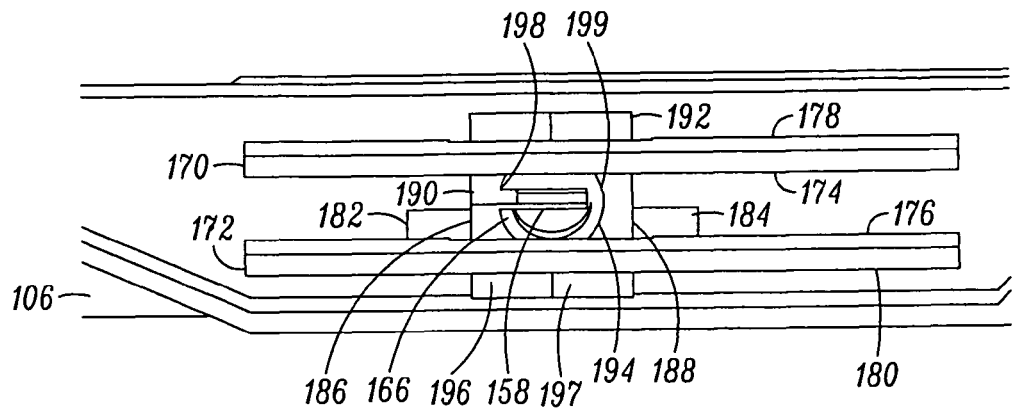
FIG. 14 is an enlarged perspective view of portions of FIG. 12, when the key switches are in a neutral position and not activated.
Figure 15:
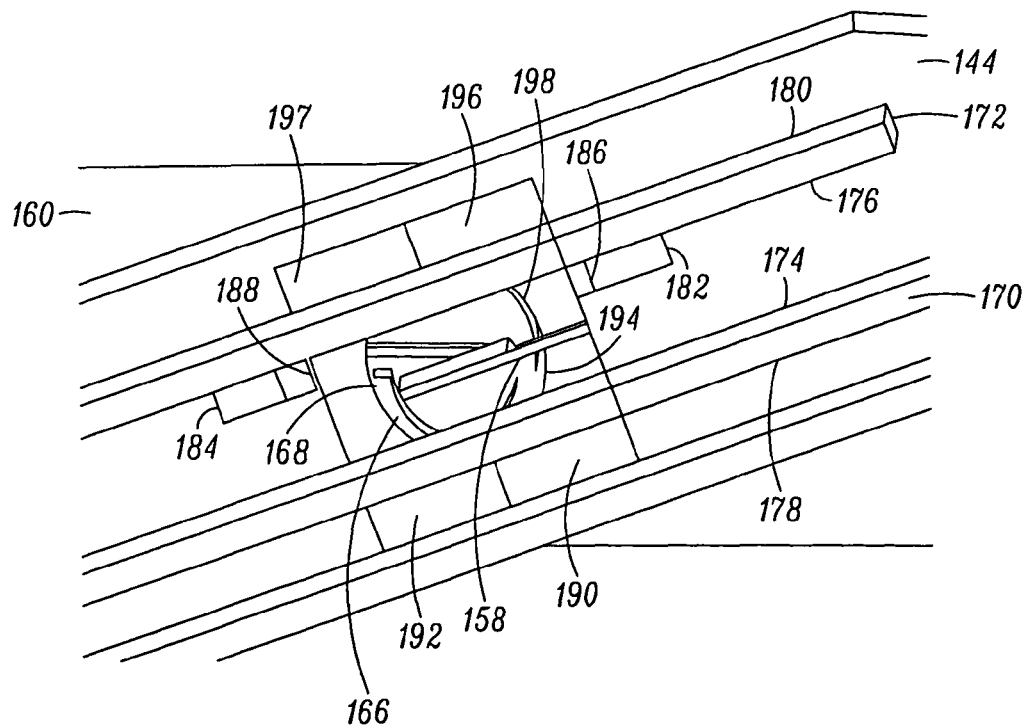
FIG. 15 is an enlarged perspective interior view of the base and flip in the open position in an electronic device when the key switches are in a neutral position and not activated and illustrating the printed circuit boards (PCB), pin, actuator plates and flex.
Figure 16:
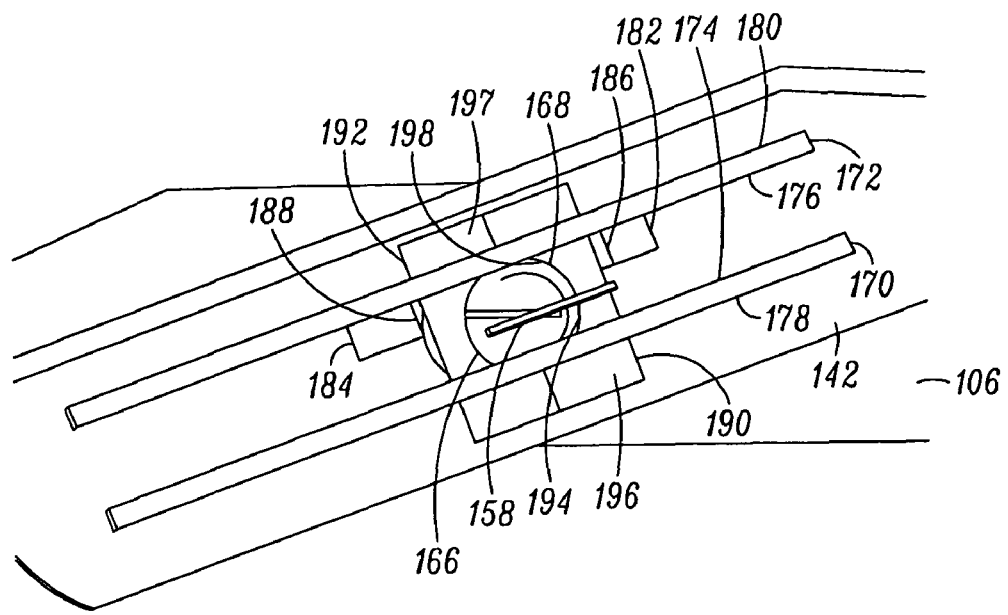
FIG. 16 is an enlarged perspective interior view similar to FIG. 15 when the forward (upper) key switch is activated.
Figure 17:
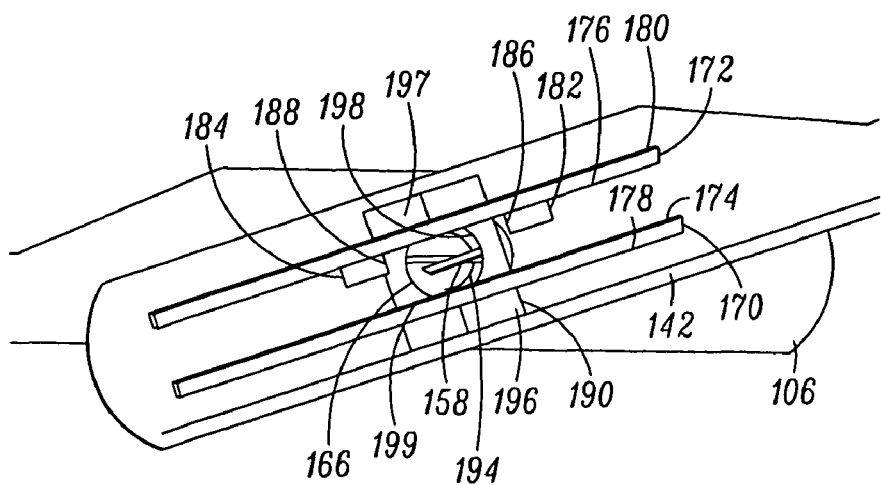
FIG. 17 is an enlarged perspective interior view similar to FIG. 15 when rearward (lower) key switch activated is activated.
Figure 18:
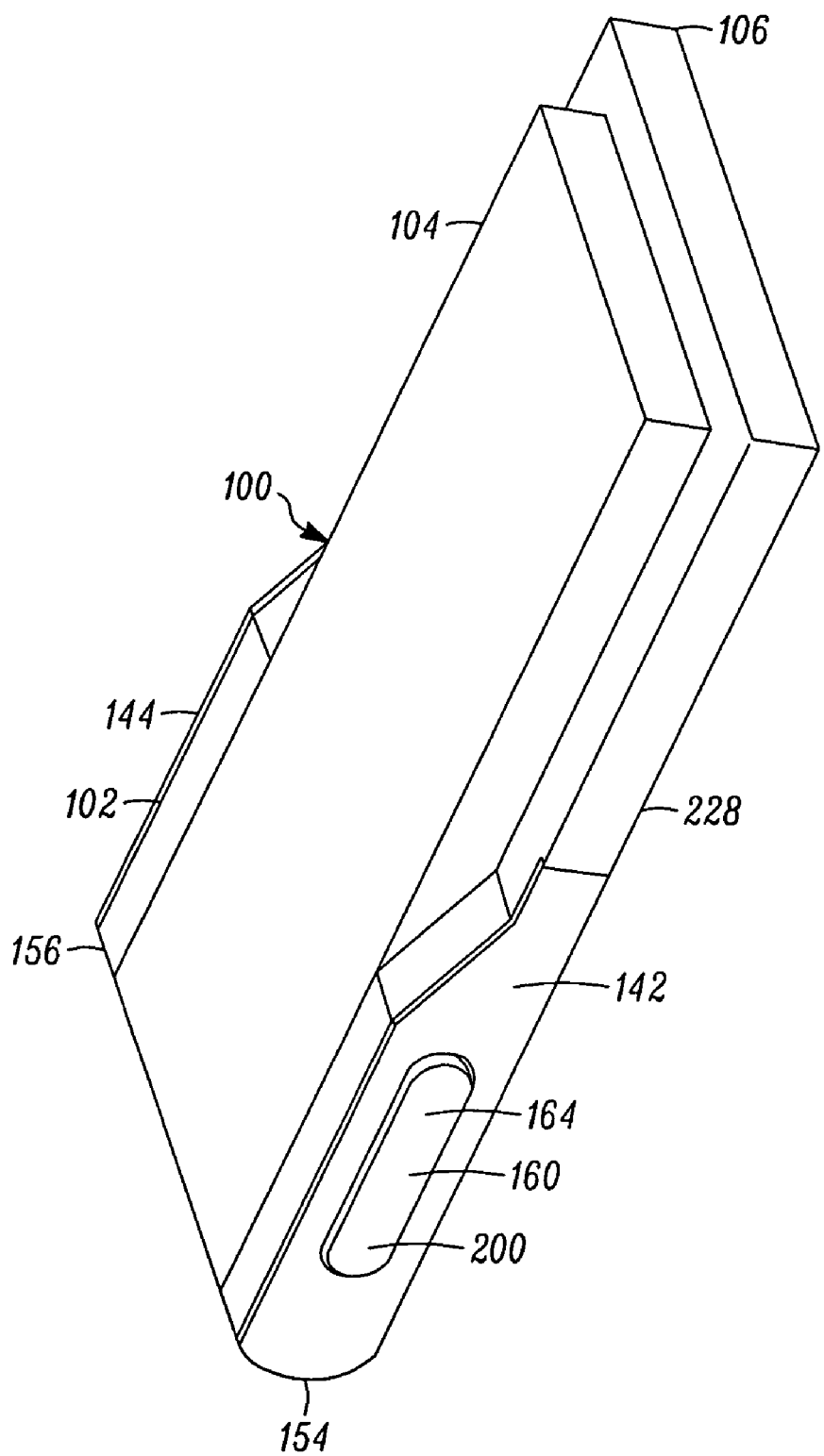
FIG. 18 is a further perspective view of the electronic device shown in a closed position.
Figure 33:
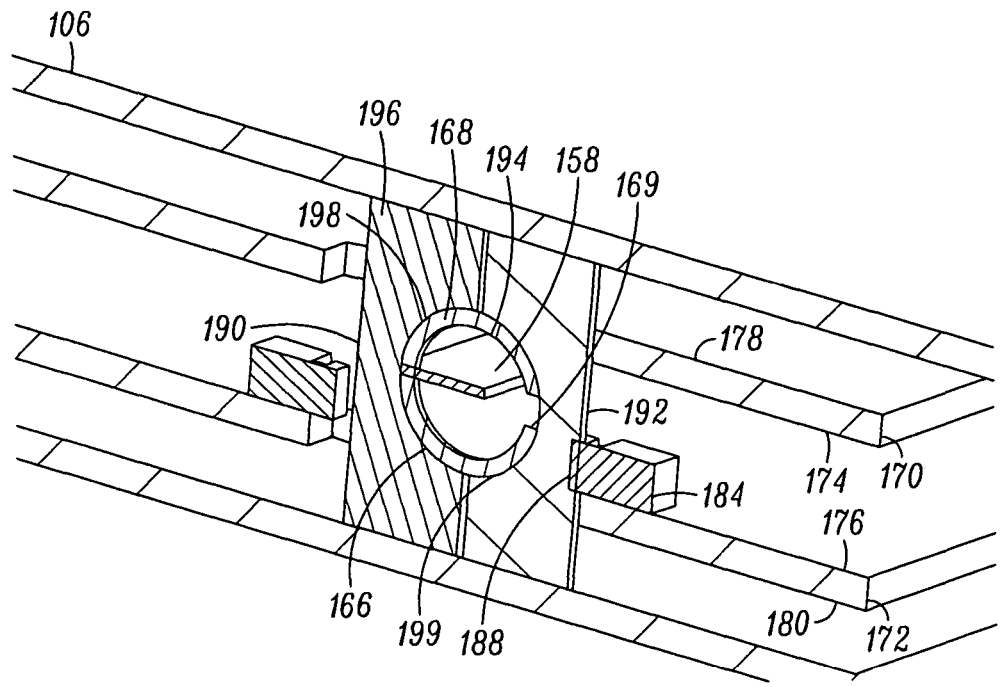
FIG. 33 is an enlarged cross-section interior perspective view of a portion of the electronic device with the flip in the closed position.
Figure 34:
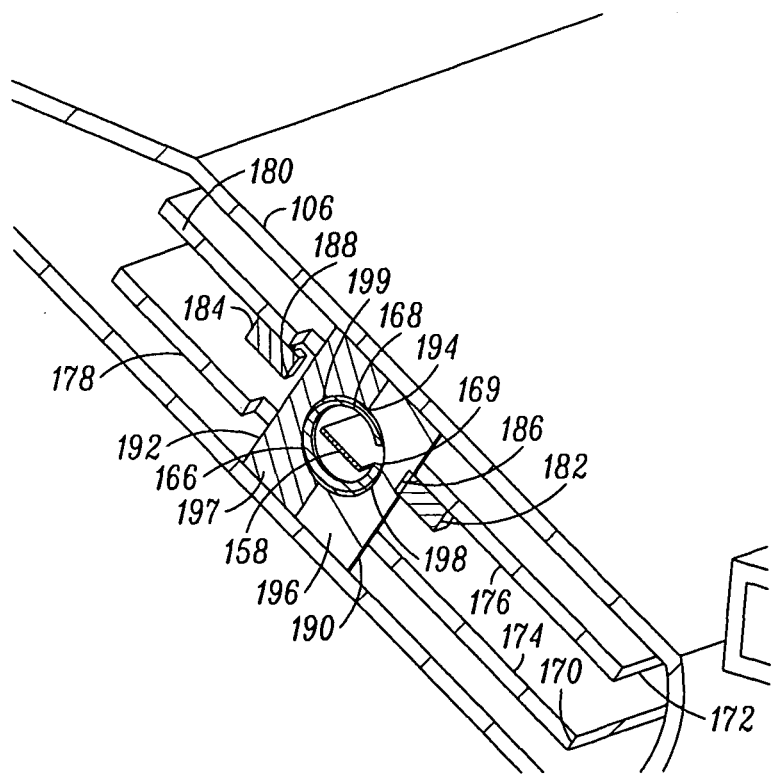
FIG. 34 is an enlarged cross-section interior perspective view of a portion of the electronic device with the flip in the open position.

The movable side keys can be positioned along the exterior outer side of at least one of the goalposts and extend into the hollow interior of that goalpost. Each side key can comprise plastic finger-engageable keycap 164 (cap) (FIG. 10). The side keys can be moveable from a neutral inactive position to forward and rearward activated positions. The side keys can have an elongated pin 166 (FIG. 11) comprising a pivotable cam 168 that extends inwardly and substantially perpendicular from the keycap through the hollow interior of the goalpost into the hardware compartment. The pin can be disposed in proximity to the flex. The pin can comprise and provide: a shaft, a stem, a cylindrical pin, a circular pin with a circular cross section, an oval pin with an oval cross section, a C-shaped slotted pin with a slot 169 (slit) (FIGS. 33 and 34), a tubular pin, a hollow pin, a side key actuator pin, an actuator pin, or a switch activator, or a combinations of any of the preceding. The pin can be made of plastic or metal.

At least a portion of the pin can be positioned between parallel printed circuit boards (PCB) 170 and 172 (FIGS. 12-17) located in the hardware compartment. Portions of the printed circuit boards can be parallel to portions of the flex. The circuit boards can have inner surfaces 174 and 176 which can face each other and can also face a portion of the pin and flex. The circuit boards can also have outer surfaces 178 and 180 which can face away from each other and also can face away from a portion of the flex. Key switches 182 and 184 can be positioned in the hardware compartment and spaced away from the goalposts. The key switches can comprise buttons 186 and 188 which can be located on the inner surfaces of one of the printed circuit boards. The key switches can comprise forward and rearward buttons 186 and 188 on longitudinally opposite sides of the pin.

Cam plates 190 and 192 (FIGS. 12-17) can provide actuators which are positioned in the hardware compartment. The cam plates can be matingly engageable and can be complementary in shape and mirror images of each other. The cam plates can also cooperate with each other to define a central pin-receiving opening 194 for receiving the pin comprising the cam. Each of the cam plates can comprise a larger body section 196 or 197 with a general rectangular, C-shaped, or inverted C-shaped body 196 or 197. Each cam plate can have a concave rounded pin-engaging section 198 or 199 for engaging and receiving the pin comprising said cam. The cam plates can include a forward cam plate 190 for engaging the forward button of the switches when the side key is moved to a forward activated position. The cam plates can also include a rearward cam plate 192 for engaging the rearward button of the switches when the side key is moved to a rearward activated position. Desirably, the cam plates cooperate with said pin so that the distance of movement of the keycap and switches are about the same when the flip is moved to an open or closed position. The cam plates and switches can be made of conductive metal.

Each keycap can comprise a slidable (sliding) T-shaped keycap 164 with a finger-engageable side 200 (FIGS. 20-24) and an inner flange 202. The inner flange can be located in the hollow interior of the goalpost along the interior inner surface (side wall) of the exterior outer side of the goalpost. The inner flange can be longer and thinner than the side of the key cap. The pin comprising the cam can extend inwardly from and perpendicular to the flange.

The forward and rearward key switches 182 and 184 (FIG. 22) can have forward and rearward buttons 186 and 188, smaller necks 204 and 206 and enlarged heads 208 and 210. The buttons can have cam-plate engagement surfaces 212 and 214 for being engaged and contacted by the button-engagement surfaces 216 and 218 of the cam plates 190 and 192.

Instead of a slider keycap, each keycap can also comprise a rotating (rotatable) T-shaped keycap 220 (FIG. 35) with finger-engageable wings 222 and 224 comprising a flange that extends from a thinner central intermediate section 226. The pin comprising the cam can extend inwardly from and perpendicular to the central intermediate section of the rotating keycap. The rotating keycap can comprise a rotatable (rotating) cap, a pivotable (pivoting) keycap, or a rockable (rocking) cap, The electronic device can have a battery compartment 228 in the base or flip for receiving one or more batteries to energize the keyboard, electronic displays, and printed circuit boards. An access panel can be provided to access the battery compartment. The access panel can comprise a door and/or be slidable, pivotable or removable. In some circumstance, the battery compartment case can be sealed and user access to the battery can be limited or fully precluded.

The upper outward surface of the upper first housing of the flip can include an electronic display, microphone, speaker and push buttons. The electronic display can comprises an LCD display, OLED display, and/or touch screen. The microphone can be positioned at one end of the flip, or on an edge itself. The speaker can be positioned on the opposing end of flip opposite the microphone.

The upper inner surface of the lower second housing of the base can include a speaker. The keyboard on the base can comprises a membrane type keyboard (keypad) with a backlit alpha-numeric display. The keys of the keypad can be colored. The keyboard can also comprise a touch screen display.

In operation and use, the flip can be closed or pivoted and moved to a compact collapsed closed position in the tablet mode. In the closed position, the interior inwardly facing inward surfaces of the flip and base abut and face each other so that the inward surfaces and hardware compartment are hidden from view in the interior of the electronic device and are not accessible to the user. In the closed position, the exterior outer surfaces of the flip and base are visible and accessible to the user.

The flip can be opened, tilted or pivoted and moved to an open position in the qwerty mode. In the open position, the user can readily and fully access the keyboard, keypad or touch screen of the base while having full access and view of the hardware compartment and the inwardly facing screen of the flip.

The keycaps of the side keys can be moveable from a neutral inactive position to forward (upward) and rearward (downward) activated positions. In the neutral inactive position, the cam plates are spaced apart from and do not contact and engage the buttons of the key switches. In the forward activated position, the forward cam plate contacts and engages the forward button of the forward key switch, while the rearward cam plate is spaced apart from and does not contact and engage the rearward button of the rearward key switch. In the rearward activated position, the rearward cam plate contacts and engages the rearward button of the rearward key switch, while the forward cam plate is spaced apart from and does not contact and engage the forward button of the forward key switch.

Among the many advantages of the electronic devices with improved offset hinges are:
1. Superior capability.
2. Superb performance.
3. Enhanced button placement in the goalpost area for easy and natural hand interface.
4. Optimizes use of internal limited space inside the goalpost.
5. Excellent side keys and buttons.
6. Compact.
7. Reliable.
8. Fewer components.
9. Light weight.
10. Portable.
11. User friendly.
12. Easy to use.
13. Durable.
14. Economical.
15. Attractive.
16. Efficient.
17. Effective.

Although embodiments of the invention have been shown and described, it is to be understood that various modifications, substitutions, and rearrangements of parts, components, and/or process (method) steps, as well as other uses of the electronic device, can be made by those skilled in the art without departing from the novel spirit and scope of this invention. The preceding description merely explains and illustrates the invention and the invention is not limited thereto except insofar as the appended claims are so limited.

What is claimed is:
1. An electronic device, comprising:
a flip providing a top and cover of an electronic device, said flip comprising a first housing having an inward upper surface, an outward upper surface and an upper edge connecting the inward upper surface and the outward upper surface, said flip having a hardware compartment, at least one of the upper surfaces of the first housing including a screen providing an electronic display disposed longitudinally from the hardware compartment;

a base providing a bottom for manually grasping the electronic device, said base comprising a second housing having an inward lower surface, an outward lower surface and a lower edge connecting the inward lower surface and the outward lower surface, said base having a keyboard section and goalposts extending longitudinally from the keyboard section, the inward lower surface of the keyboard section including a keyboard;

said goalposts having exterior side and defining a cutout area providing an opening for receiving the hardware compartment, and at least one of said goalposts having a substantially hollow interior with a closed end;

an offset hinge extending substantially transversely across the goalposts for pivotally connecting the flip to the base along an axis of rotation so that said flip can be moved from a closed position on top of the base to an open position with the flip opened at an angle of inclination relative to the base;

said hardware compartment being aligned between the goalposts when the electronic device is in the closed position and in the open position;

a switch; and at least one side key position along and extending into the hollow interior of the goalpost for engaging said switch.

2. The electronic device of claim 1 wherein said side key is positioned along the goalpost at a location spaced above and offset from the axis of rotation of the hinge when the flip is in the closed position.

3. The electronic device of claim 1 wherein said the side key is positioned along the goalpost at a location below the axis of rotation and between the electronic display of the flip and axis of rotation of the hinge when the flip is in the closed position.

4. The electronic device of claim 1 wherein said side keys comprises two side key positioned on both sides of the axis of rotation of the hinge.

5. The electronic device of claim 1 wherein flex is positioned and routed in the goalpost for connecting the base and the flip.

6. The electronic device of claim 1 wherein said side key comprise a cap.

7. The electronic device of claim 1 including:

said switch is located in the hardware compartment or hollow interior of the goalpost, and said switch is spaced from and positioned in offset relationship to the axis of rotation of the hinge; and said hardware compartment is thicker than said keyboard section.

8. An electronic device, comprising:

a flip providing a top and cover of an electronic device, said flip comprising a first housing having an inward upper surface, an outward upper surface and an upper edge connecting the inward upper surface and the outward upper surface, said flip having a hardware compartment and at least one of the upper surfaces of the first housing including a screen providing an electronic display disposed longitudinally from the hardware compartment;

a base providing a bottom for manually grasping the electronic device, said base comprising a second housing having an inward lower surface, an outward lower surface and a lower edge connecting the inward lower surface and the outward lower surface, said base having a keyboard section comprising a keyboard, said base having goalposts extending longitudinally forwardly of the lower edge and the keyboard section, said goalposts connected to the lower edge of the base, and said base having a crossbar extending substantially transversely between and connecting the goalposts;

said goalposts having exterior outer sides cooperating with said crossbar of the base to define a cutout area providing an opening for receiving the hardware compartment of the flip, and each of said goalposts each having a substantially hollow interior with a closed end;

a flex positioned in the hollow interior of at least one of said goalposts and extending to connect the base to the flip;

an offset hinge extending substantially transversely across the goalposts at a position spaced from and substantially parallel to the crossbar for pivotally connecting the flip to the base along an axis of rotation so that said flip can be moved from a closed position on top of the base to an open position with the flip opened at an angle of inclination relative to the base;

said hardware compartment being aligned between the goalposts when the electronic device is in the closed position and in the open position;

at least one printed circuit board positioned in the hardware compartment;

at least one key switch positioned in the hardware compartment and spaced from the goalposts, said key switch comprising a button disposed in proximity to the printed circuit board;

at least one movable side key positioned along the exterior outer side of said one goalpost and extending into the hollow interior of said one goalpost, said side key comprising a keycap, and said side key being moveable from a neutral inactive position to at least one activated position;

a pin comprising a cam extending axially inwardly from said keycap through the hollow interior of said one goalpost into the hardware compartment, said pin being disposed in proximity to the flex;

at least one cam plate providing an actuator positioned in the hardware compartment, said cam plate comprising a body with a concave rounded pin-engaging section for engaging and receiving said pin comprising said cam, and said cam plate engaging the button of the switch when the side key is moved to an activated position.

9. The electronic device of claim 8 wherein said pin is selected from the group consisting of: a shaft, a stem, a cylindrical pin, a circular pin, an oval pin, a C-shaped pin, a tubular pin, a hollow pin, a side key actuator pin, an actuator pin, a switch activator, and combinations of two or more of the preceding.

10. The electronic device of claim 8 wherein said cap is selected from the group consisting of: a keycap, a slidable cap, a rotatable cap, a pivotable keycap, a rockable cap, and combinations of two or more of the preceding.

11. An electronic device, comprising:

a flip providing a top and cover of an electronic device, said flip comprising a first housing having an inward upper surface, an outward upper surface and an upper edge connecting the inward upper surface and the outward upper surface, said outward upper surface of the first housing including an outer display screen providing an outer electronic display, said inward upper surface of the first housing including an inner display screen providing an inner electronic display, and said flip having a hardware compartment positioned longitudinally from the inner and outer display screens;

a base providing a bottom for manually grasping the electronic device, said base comprising a second housing having an inward lower surface, an outward lower surface and a lower edge connecting the inward lower surface and the outward lower surface, said base having a keyboard section comprising a keyboard, said base having substantially parallel elongated goalposts extending longitudinally forwardly of the lower edge and the keyboard section, said goalposts connected to and cantilevered from the lower edge of the base, and a crossbar extending substantially transversely between and connecting the goalposts;

said goalposts having exterior outer sides and inner sides, said inner sides of said goal posts cooperating with said crossbar of the base to define a cutout area for providing an opening for receiving the hardware compartment of the flip, said goalposts each having a substantially hollow interior with a closed end providing a rounded tip;

a flex positioned in the hollow interior of at least one of said goalposts and extending to connect the base to the flip;

an offset hinge extending substantially transversely across the goalposts at a position spaced from and substantially parallel to the crossbar for pivotally connecting the flip to the base along an offset axis of rotation so that said flip can be moved from a closed position on top of the base to an open position with the flip opened at an angle of inclination ranging from about 150 degrees to about 180 degrees relative to the base, said flex extending along a portion of said hinge;

said hardware compartment being aligned between the goalposts when the electronic device is in the closed position and in the open position;

substantially parallel printed circuit boards positioned in the hardware compartment, at least portions of said printed circuit boards being substantially parallel to portions of the flex, said circuit boards having inner surfaces facing each other and facing a portion of the pin and flex, and said circuit boards having outer surfaces facing away from each other and facing away from the portion of the flex;

key switches positioned in the hardware compartment and spaced from the goalposts, said key switches providing buttons on the inner surfaces of one of the printed circuit boards, said key switches comprising forward and rearward buttons located on longitudinally opposite sides of the pin;

at least one movable side key positioned along the exterior outer side of said one goalpost and extending into the hollow interior of said one goalpost, said side key comprising a finger-engageable keycap, and said side key being moveable from a neutral inactive position to forward and rearward activated positions;

said side key having an elongated pin comprising a pivotable cam extending inwardly and substantially perpendicular from said keycap through the hollow interior of said one goalpost into the hardware compartment, said pin being disposed in proximity to the flex, and at least a portion of said pin being positioned between the printed circuit boards;

cam plates providing actuators positioned in the hardware compartment, said cam plates being matingly engageable and complementary to each other, said cam plates cooperating with each other to define a central pin-receiving opening for receiving said pin comprising said cam, each of said cam plates comprising a body with a concave rounded pin-engaging section for engaging and receiving said pin comprising said cam, said cam plates including a forward cam plate for engaging the forward button of the switches when the side key is moved to a forward activated position and said cam plates including a rearward cam plate for engaging the rearward button of the switches when the side key is moved to a rearward activated position, and a battery compartment for receiving at least one battery to energize the keyboard, electronic displays, and printed circuit boards.

12. The electronic device of claim 11 wherein the electronic device is selected from the group consisting of an electronic device with a clamshell configuration, a radiotelephone, a cellular phone, a mobile phone, a smart phone, and combinations thereof.

13. The electronic device of claim 11 wherein said pin comprises a side key actuator pin.

14. The electronic device of claim 11 wherein said pin comprises a tubular hollow pin for help routing the flex and for providing a switch activator.

15. The electronic device of claim 11 wherein said pin comprises an oval pin with an oval cross-section.

16. The electronic device of claim 11 wherein said pin comprises a C-shaped slotted pin.

17. The electronic device of claim 11 wherein said keycap is a rotatable keycap.

18. The electronic device of claim 11 wherein said keycap is a slidable keycap.

19. The electronic device of claim 11 wherein the hardware compartment and goalposts have a thickness greater than thickness of the keyboard and electronic displays between the outer and inner surfaces.

20. The electronic device of claim 11 wherein:
said cam plates cooperate with said pin so that the distance of movement of the keycap and switches are about the same when the flip is moved to an open or closed position; and
said printed circuit boards are positioned at an angle of inclination of about 10 degrees to about 30 degrees when the flip in the open position.

* * * * *